(12) United States Patent
Denny, Jr. et al.

(10) Patent No.: US 7,739,132 B2
(45) Date of Patent: Jun. 15, 2010

(54) CORRECTING AND MONITORING STATUS OF HEALTH CARE CLAIMS

(75) Inventors: James McCahill Denny, Jr., Atlanta, GA (US); Thomas Craig Bridge, Lawrenceville, GA (US); Kenneth Paul Bradley, Greenwood, IN (US); Shawn Kevin Edwards, Gainesville, GA (US)

(73) Assignee: Navicure, Inc., Duluth, GA (US)

( * ) Notice: Subject to any disclaimer, the term of this patent is extended or adjusted under 35 U.S.C. 154(b) by 1601 days.

(21) Appl. No.: 10/688,363

(22) Filed: Oct. 17, 2003

(65) Prior Publication Data

US 2004/0133452 A1  Jul. 8, 2004

Related U.S. Application Data

(60) Provisional application No. 60/419,713, filed on Oct. 17, 2002.

(51) Int. Cl.
*G06Q 10/00* (2006.01)

(52) U.S. Cl. .......................................................... 705/4

(58) Field of Classification Search .................. 705/2–4
See application file for complete search history.

(56) References Cited

U.S. PATENT DOCUMENTS

| | | | | |
|---|---|---|---|---|
| 5,359,509 A | * | 10/1994 | Little et al. | 705/2 |
| 6,341,265 B1 | * | 1/2002 | Provost et al. | 705/4 |
| 6,879,959 B1 | * | 4/2005 | Chapman et al. | 705/2 |
| 2002/0120473 A1 | * | 8/2002 | Wiggins | 705/4 |

* cited by examiner

*Primary Examiner*—Gerald J. O'Connor
*Assistant Examiner*—Rajiv J Raj
(74) *Attorney, Agent, or Firm*—Morris Manning & Martin LLP; John R. Harris, Esq.; Daniel E. Sineway, Esq.

(57) ABSTRACT

The system is an advanced, web-enabled, clearinghouse that facilitates efficient and effective claim routing, monitoring and report retrieval. A claim status summary is displayed that links directly to a rejected claim listing, wherein each rejected claim listed is a link to associated detailed claim information. The detailed claim information display has fields to edit the associated detailed claim information. During the editing process, a rules verification is performed against the edited claim information to ensure the edit comply with the known rules for the associated payer. Upon successfully completing the rules verification, the edited claim is submitted to a payer.

26 Claims, 19 Drawing Sheets

CLAIM MANAGEMENT SYSTEM

FIG. 1

REF.ENTITIES

Indexes
ENTITIES_04_IDX (customer_entity, parent_identifier_code, record_state, entity_id, organization_name)
ENTITIES_02_IDX (entity_id)
ENTITIES_03_IDX (last_name, first_name)

Layout

| Column Name | Data Type | Nullable | Description |
|---|---|---|---|
| ADDITIONAL_NAME_INFO | VARCHAR2(60) | YES | Optional additional name information |
| ADDRESS_ENTITY | VARCHAR2(8) | YES | Address ID of the physical address for the entity |
| ADDRESS_REV_NO | NUMBER(5) | YES | The revision of the physical address this record is linked to |
| BILLING_ADDRESS_ENTITY | VARCHAR2(8) | YES | Address ID of the billing address for the entity |
| BILLING_ADDRESS_REV_NO | NUMBER(5) | YES | The revision of the billing address this record is linked to |
| CITIZEN_STATUS_CODE | VARCHAR2(100) | YES | A code indicating the citizenship of the entity. See Code List "CITIZEN STATUS CODES" for values |
| CLIENT_LINK | VARCHAR2(8) | YES | Unavailable |
| COUNTRY_CODE | VARCHAR2(100) | YES | A code indicating the country of the entity. See Code List "COUNTRY CODES" for values |
| CUSTOMER_ENTITY | VARCHAR2(8) | NO | The value assigned to a customer which uniquely identifies the organization within the system |
| CUSTOMER_ID | VARCHAR2(30) | YES | The value assigned to a customer which uniquely identifies the organization within the system |
| DATE_OF_BIRTH | VARCHAR2(35) | YES | The date of birth |
| DATE_OF_BIRTH_FMT | VARCHAR2(100) | YES | The format of the date_of_birth field |
| ENTITY_ID | VARCHAR2(8) | NO | Unique value used to identify an entity for a customer |
| ENTITY_TYPE_QUALIFIER | VARCHAR2(100) | YES | A code indicating whether the entity is a person or a non-person entity. See Code List "ENTITY TYPES" for values |
| FIRST_NAME | VARCHAR2(40) | YES | The first name of the entity |
| FREE_FORM_NAME | VARCHAR2(60) | YES | A free form name for the entity |
| GENDER_CODE | VARCHAR2(100) | YES | The entities gender. See Code List "GENDER CODES" for values |
| LAST_NAME | VARCHAR2(40) | YES | Last name of the entity. Used only for person entities |
| LINK | VARCHAR2(8) | YES | Used to link navicure entities with customer specific entities. Entity ID of navicure entity is placed in the link field |
| MAILING_ADDRESS_ENTITY | VARCHAR2(8) | YES | Address ID of the mailing address for the entity |
| MAILING_ADDRESS_REV_NO | NUMBER(5) | YES | The revision of the mailing address this record is linked to |
| MAP_CODE | VARCHAR2(100) | YES | Unavailable |
| MARITAL_STATUS_CODE | VARCHAR2(100) | YES | A code indicating the marital status of the entity. See Code List "MARITAL STATUS CODES" for values |
| MATCH_LEVEL_1 | VARCHAR2(4000) | YES | Unavailable |
| MIDDLE_NAME | VARCHAR2(40) | YES | The middle name of the entity |
| MODIFIED_BY | VARCHAR2(30) | YES | The user that modified the record. Stored as CUSTOMER_ENTITY:ENTITY_ID |
| NAME_PREFIX | VARCHAR2(100) | YES | The name prefix. See Code List "SALUTATIONS" for values |
| NAME_SUFFIX | VARCHAR2(100) | YES | The name suffix |
| ORGANIZATION_NAME | VARCHAR2(40) | YES | The name of the oraganization, practice, facility, etc... Used only for non-person entities |
| OWNER_ENTITY | VARCHAR2(8) | YES | Unavailable |
| PARENT_IDENTIFIER_CODE | VARCHAR2(8) | YES | Unavailable |
| RACE_OR_ETHNICITY_CODE | VARCHAR2(100) | YES | A code indicating the race or ethnicity of the entity. See Code List "ETHNICITY CODES" for values |
| RECORD_STATE | CHAR(1) | YES | The current state of the record. Default is (A)ctive. See Code List "RECORD STATE CODES" for values |
| REVISION_NO | NUMBER(5) | YES | Indicates the total number of times the record has been modified. Default is 1 |
| SOCIAL_SECURITY_NO | VARCHAR2(11) | YES | Government assigned social security number |
| TAX_ID | VARCHAR2(11) | YES | Government assigned tax id or ein number |
| TIMESTAMP | DATE | YES | The Date/Time the record was created or modified. It is maintained internally by the system |

FIG. 6

REF.SUBSCRIBER_PAYER

Layout  C18     C20     C22     C24

| Column Name | Data Type | Nullable | Description |
|---|---|---|---|
| ASSIGNMENT_OF_BENEFITS_IND | VARCHAR2(100) | YES | Unavailable |
| CLAIM_OFFICE_NUMBER | VARCHAR2(30) | YES | Unavailable |
| CLIENT_NUMBER | VARCHAR2(80) | YES | Unavailable |
| COORDINATION_OF_BENEFITS_CODE | VARCHAR2(100) | YES | Unavailable |
| CUSTOMER_ENTITY | VARCHAR2(8) | NO | The value assigned to a customer which uniquely identifies the organization within the system |
| CUSTOMER_ID | VARCHAR2(30) | YES | The value assigned to a customer which uniquely identifies the organization within the system |
| EMPLOYER_NAME | VARCHAR2(60) | YES | Unavailable |
| EMPLOYMENT_STATUS_CODE | VARCHAR2(100) | YES | Unavailable |
| FEDERAL_TAX_ID | VARCHAR2(30) | YES | Unavailable |
| GROUP_OR_PLAN_NAME | VARCHAR2(80) | YES | Unavailable |
| INSURANCE_TYPE_CODE | VARCHAR2(100) | YES | Unavailable |
| INSURED_GROUP_OR_POLICY_NO | VARCHAR2(80) | YES | Unavailable |
| MAP_CODE | VARCHAR2(100) | YES | Unavailable |
| MODIFIED_BY | VARCHAR2(30) | NO | The user that modified the record. Stored as CUSTOMER_ENTITY:ENTITY_ID |
| PAYER_ENTITY | VARCHAR2(8) | YES | Entity ID of the payer |
| PAYER_IDENTIFICATION | VARCHAR2(80) | YES | Unavailable |
| PAYER_RESPONSIBLE_SEQ_NO_CODE | VARCHAR2(100) | YES | Unavailable |
| PAYER_REV_NO | NUMBER(5) | YES | The revision of the payer this record is linked to |
| RECORD_STATE | CHAR(1) | NO | The current state of the record. Default is (A)ctive. See Code List "RECORD STATE CODES" for values |
| REVISION_NO | NUMBER(5) | YES | Indicates the total number of times the record has been modified. Default is 1 |
| SOURCE_OF_PAY | VARCHAR2(100) | YES | Unavailable |
| SUBSCRIBER_ENTITY | VARCHAR2(8) | YES | Entity ID of the subscriber/insured |
| SUBSCRIBER_MEMBER_ID | VARCHAR2(80) | YES | Unavailable |
| SUBSCRIBER_PLAN_ID | VARCHAR2(8) | NO | Unavailable |
| SUBSCRIBER_REV_NO | NUMBER(5) | YES | The revision of the subscriber/insured this record is linked to |
| TIMESTAMP | DATE | NO | The Date/Time the record was created or modified. It is maintained internally by the system |

*FIG. 7*

REF.PAYER_PROVIDER

Layout

| Column Name | Data Type | Nullable | Description |
|---|---|---|---|
| CURRENCY_CODE | VARCHAR2(100) | YES | Unavailable |
| CUSTOMER_ENTITY | VARCHAR2(8) | NO | The value assigned to a customer which uniquely identifies the organization within the system |
| CUSTOMER_ID | VARCHAR2(30) | YES | The value assigned to a customer which uniquely identifies the organization within the system |
| MAP_CODE | VARCHAR2(100) | YES | Unavailable |
| MODIFIED_BY | VARCHAR2(30) | NO | The user that modified the record. Stored as CUSTOMER_ENTITY.ENTITY_ID |
| PAYER_ENTITY | VARCHAR2(8) | YES | Entity ID of the payer |
| PAYER_REV_NO | NUMBER(5) | YES | The revision of the payer this record is linked to |
| PROVIDER_CODE | VARCHAR2(100) | YES | Unavailable |
| PROVIDER_ENTITY | VARCHAR2(8) | YES | Entity ID of the provider entity |
| PROVIDER_ORGINIZATION_CODE | VARCHAR2(100) | YES | Unavailable |
| PROVIDER_PRIMARY_ID_QUALIFIER | VARCHAR2(100) | YES | Unavailable |
| PROVIDER_REV_NO | NUMBER(5) | YES | The revision of the provider this record is linked to |
| PROVIDER_SIGNATURE_ON_FILE | CHAR(1) | YES | Unavailable |
| PROVIDER_TAXONOMY_CODE | VARCHAR2(100) | YES | Unavailable |
| RECORD_STATE | CHAR(1) | NO | The current state of the record. Default is (A)ctive. See Code List "RECORD STATE CODES" for values |
| REVISION_NO | NUMBER(5) | YES | Indicates the total number of times the record has been modified. Default is 1 |
| STATE_OR_PROVINCE_CODE | VARCHAR2(100) | YES | Unavailable |
| TIMESTAMP | DATE | NO | The Date/Time the record was created or modified. It is maintained internally by the system |

*FIG. 8*

REF.PATIENTS_PLAN

T16

| Column Name | Data Type | Nullable | Description |
|---|---|---|---|
| CUSTOMER_ENTITY | VARCHAR2(8) | NO | The value assigned to a customer which uniquely identifies the organization within the system |
| CUSTOMER_ID | VARCHAR2(30) | YES | The value assigned to a customer which uniquely identifies the organization within the system |
| DEFAULT_BILLING_PROVIDER | NUMBER(8) | YES | Unavailable |
| DEFAULT_FACILITY_ENTITY | VARCHAR2(8) | YES | Unavailable |
| DEFAULT_RENDERING_PROVIDER | NUMBER(8) | YES | Unavailable |
| INSURED_RELATION_TO_PATIENT | VARCHAR2(100) | YES | Explains the relationship between the insured/subscriber and the patient. See Code List "RELATIONSHIPS" for values |
| MAP_CODE | VARCHAR2(100) | YES | Unavailable |
| MODIFIED_BY | VARCHAR2(30) | NO | The user that modified the record. Stored as CUSTOMER_ENTITY.ENTITY_ID |
| PATIENT_ENTITY | VARCHAR2(8) | YES | Entity ID of the patient entity |
| PATIENT_PLAN_ID | VARCHAR2(8) | YES | A unique number identifying the "insurance plan/patient" combination |
| PATIENT_RELATION_TO_INSURED | VARCHAR2(100) | YES | Explains the relationship between the patient and the insured/subscriber. See Code List "RELATIONSHIPS" for values |
| PATIENT_REV_NO | NUMBER(5) | YES | The revision of the patient the record is linked to |
| PATIENT_SIGNATURE_DATE | VARCHAR2(35) | YES | Unavailable |
| PATIENT_SIGNATURE_DATE_FMT | VARCHAR2(100) | YES | Unavailable |
| PATIENT_SIGNATURE_SOURCE_CODE | VARCHAR2(100) | YES | Unavailable |
| RECORD_STATE | CHAR(1) | NO | The current state of the record. Default is (A)ctive. See Code List "RECORD STATE CODES" for values |
| RELEASE_OF_INFORMATION_CODE | VARCHAR2(100) | YES | Unavailable |
| RELEASE_OF_INFORMATION_DATE | VARCHAR2(35) | YES | Unavailable |
| RELEASE_OF_INFO_DATE_FMT | VARCHAR2(100) | YES | Unavailable |
| REVISION_NO | NUMBER(5) | YES | Indicates the total number of times the record has been modified. Default is 1 |
| SUBSCRIBER_PLAN_ID | VARCHAR2(8) | YES | Unavailable |
| SUBSCRIBER_PLAN_REV_NO | NUMBER(5) | YES | The revision of the subscriber's plan the record is linked to |
| TIMESTAMP | DATE | NO | The Date/Time the record was created or modified. It is maintained internally by the system |

| FILE | EDIT | VIEW | FAVORITES | TOOLS | HELP | | |
|---|---|---|---|---|---|---|---|
| ADDRESS | | | ▽ | | ⇨ GO | ⇦ BACK | ⇨ FORWARD | ⊗ STOP | ⟳ REFRESH | ⌂ HOME |

| HOME | BUSINESS ADMIN | CLAIM SUBMISSION | HIPAA 1500 | REPORT | SERVICES | SUPPORT | LOGO |

FACILITY OFFICE    USER:    USERNAME CONNECTED ON 01/01/2003 AT 90:45
                   CURRENT FACILITY:    SOUTH FACILITY OFFICE

HOMEPAGE

CLAIM SCOREBOARD

SCOREBOARD

| DATE RANGE | CUSTOM: ○ | FROM: | TO: | | DISPLAY BY | | |
|---|---|---|---|---|---|---|---|
| SINCE LAST LOGIN | ○ SINCE LAST SUBMIT | ● ALL | | COUNTS: ○ | DOLLARS: ○ | | |
| YTD | MTD | ○ WTD | ○ TODAY | ○ YESTERDAY | | | |

| | SUBMITTED | IN PROCESS | CANCELLED | ATTENTION REQUIRED | | FILING COMPLETE |
|---|---|---|---|---|---|---|
| | | | | REJECTED | OTHER | |
| CLEARING HOUSE | 8799 | 72 | 659 | 461 | 0 | N/A |
| INSURANCE | 7615 | 3587 | 10 | 527 | 0 | 3491 |

W302

CLEARINGHOUSE (461 RECORDS)
PAGE 1 OF 1

| CLAIM ID | INSURANCE | PATIENT ACCT. | PATIENT | DOS | FACILITY | BILLING PROVIDER | BILLED AMOUNT |
|---|---|---|---|---|---|---|---|
| 8R110854 | MIDI INS. | JOHRO000 | | | | | $1,557.00 |
| ERROR MESSAGE CLAIM REQUIRES AN INSURED (POLICY NUMBER) | | | | | | | |
| 8G010805 | MIDI INS. | CORJO000 | | | | | $1,387.00 |
| ERROR MESSAGE INVALID CPT4 CODE ON LINE 1 | | | | | | | |
| 8Q10507 | GHI | MALER000 | | | | | $1,328.00 |

FIG. 12

| FILE | EDIT | VIEW | FAVORITES | TOOLS | HELP | | | | | | |
|---|---|---|---|---|---|---|---|---|---|---|---|
| ADDRESS | | | ▽ | | | GO | BACK | FORWARD | STOP | REFRESH | HOME |
| HOME | BUSINESS ADMIN | CLAIM SUBMISSION | HIPAA 1500 | | | REPORT | SERVICES | SUPPORT | | | LOGO |

FACILITY OFFICE    USER:    USERNAME CONNECTED ON 01/01/2003 AT 90:45
                   CURRENT FACILITY:    SOUTH FACILITY OFFICE

HOME:PAGE

CLAIM SCOREBOARD

SCOREBOARD

| DATE RANGE | CUSTOM: ○ | FROM: | | TO: | | DISPLAY BY | |
|---|---|---|---|---|---|---|---|
| SINCE LAST LOGIN | ○ SINCE LAST SUBMIT | | ● ALL | | | COUNTS: ○ | DOLLARS: ○ |
| YTD | MTD | ○ WTD | ○ TODAY | ○ YESTERDAY | | | |

| | SUBMITTED | IN PROCESS | CANCELLED | ATTENTION REQUIRED | | FILING COMPLETE |
|---|---|---|---|---|---|---|
| | | | | REJECTED | OTHER | |
| CLEARING HOUSE | 8799 | 72 | 659 | 461 | 0 | N/A |
| INSURANCE | 7615 | 3587 | 10 | 527 | 0 | 3491 |

INSURANCE REJECTED CLAIMS (527 RECORDS)
PAGE 1 OF 1

| CLAIM ID | INSURANCE | PATIENT ACCT. | PATIENT DOS | PATIENT | BILLING FACILITY | BILLING PROVIDER | BILLED AMOUNT |
|---|---|---|---|---|---|---|---|
| 8K0108749 | MIDI INS. | CORJ000 | | | | | $2,527.50 |
| | ERROR MESSAGE | INSURED ADDRESS INCOMPLETE | | | | | |
| | | PATIENT ZIP CODE INVALID | | | | | |
| | [r] CLAIM REJECTED BY PAYER PLEASE CORRECT AND RESUBMIT | | | | | | |
| 88014221 | AMERICAN INS. | BLABE001 | | | | | $1,746.00 |

| FILE | EDIT | VIEW | FAVORITES | TOOLS | HELP | | | | | | |
|---|---|---|---|---|---|---|---|---|---|---|---|
| ADDRESS | | | | ▼ | | GO | REPORT | BACK | FORWARD | STOP | REFRESH |

| HOME | BUSINESS ADMIN | CLAIM SUBMISSION | HIPAA 1500 | | SERVICES | SUPPORT | LOGO |
|---|---|---|---|---|---|---|---|

FACILITY OFFICE    USER:    USERNAME CONNECTED ON 01/01/2003 AT 90:45
                   CURRENT FACILITY:   SOUTH FACILITY OFFICE

FILE UPLOADS

SEARCH [DATE ▼]

FILE NAME: Book3.XLS
FILE# 1642 [REJECTED]
03:15:2002 AT 10:48
CLAIM DETAIL

FILE NAME: 120601MCD
FILE# 316 [ACCEPTED]
12:06:2001 AT 13:57
CLAIM DETAIL         W902

FILE NAME: 120601
FILE# 315 [ACCEPTED]
12:06:2001 AT 13:44
CLAIM DETAIL

FILE NAME: 120401
FILE# 314 [ACCEPTED]
12:04:2001 AT 17:37
CLAIM DETAIL

INSURANCE REJECTED CLAIMS (5 RECORDS)
PAGE 1 OF 1

| CLAIM | INSURANCE | ACCOUNT NO. | FACILITY | BILLING PROVIDER | BILLED AMOUNT |
|---|---|---|---|---|---|
| 87013289 | TRAVELERS COMP | | | | $155.00 |
| | REFERRING PHYSICIANS UPIN/ID# MISSING/INVALID | | | | |
| | [R] CLAIM REJECTED BY PAYER PLEASE CORRECT AND RESUBMIT | | | | |
| 87013433 | UNITED HEALTHCARE | | | | $300.00 |
| | REFERRING PHYSICIANS UPIN/ID# MISSING/INVALID | | | | |
| | [R] CLAIM REJECTED BY PAYER PLEASE CORRECT AND RESUBMIT | | | | |
| 87013433 | TRAVELER CASUALTY | | | | $280.00 |

CORRECTING AND MONITORING STATUS OF HEALTH CARE CLAIMS

CROSS REFERENCE TO RELATED APPLICATIONS

This application claims priority benefit under 35 U.S.C. 119(e) to U.S. Provisional Application Serial No. 60/419,713 filed on Oct. 17, 2002 titled "System and Method for Correcting and Monitoring Status of claims for Payment for Healthcare Services Rendered to a Patient," which is hereby incorporated by reference in the entirety and made part hereof.

FIELD OF THE INVENTION

This invention relates to processing health care claims, and more particularly to electronic filing, correcting, and on-line monitoring of claims for payment for healthcare services rendered to a patient.

BACKGROUND OF THE INVENTION

The majority of healthcare providers (physicians, dentists, etc.) obtain payment for medical services provided to a patient from a payer, which is generally a healthcare organization or insurance company administering a plan for the patient's employer. The form that is submitted from the healthcare provider to the payer is called a "claim." A claim is typically filled out by the healthcare provider. The claim should indicate all information required by the payer for payment of the healthcare provider for the service rendered to a patient. A properly completed claim typically identifies the physician that provided the service, a service identification code, the patient, the patient's group and plan number, payer identification, the amount of the claim, co-payment amount, etc.

There are two primary methods by which providers may submit claims to the payers:
1) send the claims on paper using a standard paper form called a HCFA 1500 form; or
2) send the claims electronically.

If the provider selects to send the claims electronically, they generally have two options:
1) a direct method that utilizes a software application provided by a payer that only accepts claims for that payer; or
2) a clearinghouse method that utilizes a software package provided by a clearinghouse that enables a provider to submit claims to multiple payers.

Typically, if a provider elects to submit all or a portion of their claims electronically, they will rely on their practice management software (PMS) vendor to facilitate an interface between their electronic connectivity solution and their PMS system. The transportation of claims from the provider's office to the payer can occur via direct dial up connection using a modem or via the Internet.

Once the claims are submitted, the payer then checks the claims to ensure that the information contained in the claim is in proper format. For example, certain service identification codes may only be five digits and have certain values uniquely identifying the service provided. In addition, the data is checked to ensure it makes sense in context. For example, an adult male patient visiting an obstetrician for a child wellness visit would cause the payer's processing system to reject the claim. A male patient should never have need of such obstetric services, and an adult would not properly receive services in connection with a child wellness visit. These checks are implemented by the healthcare payer's claim processing system are implemented as 'rules' embedded in the code of the payer's claim processing system. In some cases these 'rules' are included in the claims submission software application that resides in the providers office, whether the provider is using the direct or clearinghouse method for submitting claims. Payers have a vested interest in improving the quality of the rule edits that reside in front of the payer's claim processing system.

By editing the claims at the time of submission, the provider receives notification of any problems with the claim immediately, which enables the provider to correct the claim and resubmit the claim. This process reduces the delays in the payment process, which leads to improved provider relations and results in fewer calls from the provider to the payer's support center, thereby reducing cost for both the provider and the payer. Furthermore, by editing the claims at the time of submission, the payer avoids the expense of accepting the claim, processing the claim, and facilitating the return of the information required to correct the claim. Accepting claims that will ultimately fail in the payers system generates increased expense for the payer as well as delay in the payment of the claim. However, these edits are not easily changed once embedded in the code to accommodate rule updates, even by skilled programmers familiar with the computer language in which the rules are implemented.

In addition to rejecting claims for format and contextual errors, payers may also reject claims for reasons related to patient or provider eligibility. In those cases the claim may reject because:
1) the patient is not covered by the plan or the provider is not registered with the payer;
2) the patient or provider is not properly registered with the payer;
3) services that were rendered by the provider are not covered under the patient's payer plan;
4) the information identifying the patient or provider was submitted incorrectly; or
5) 5) the claim was filed after the timely filing deadline.

Furthermore, claims may reject for reasons related to authorizations. Authorizations are granted by payers to patients seeking access to specialists or providers other than their primary care provider (PCP). If the proper authorization has not been granted by the payer prior to claims submission, the claim may rejected.

The amount of information available to a provider about the status of their claims once they have sent them can vary dramatically, depending on the payer, the clearinghouse and the method used to submit the claims. In general there are three basic categories for the types of messages that can be returned:
1) claim File Acknowledgement—indicates the status of the claim file that was sent by a submitter. This report simply indicates whether or not the file was received and accepted by the payer.
2) claim Level Acknowledgement—preliminary status that indicates whether or not a claim has passed the first phase of editing. A claim accepted at this point is not a guarantee of payment.
3) Electronic Remittance Advice (ERA)—final report indicating acceptance or denial of the claim. If the claim is accepted, in whole or in part, it will also indicate payment amounts.

Even when these reports are available electronically, there is no guarantee that the clearinghouse intermediary will make these reports available to the provider.

Even when information is available there is little or no consistency in the messages that are returned by the different payers. As an example, a provider could receive a different message for the same claim error from each of the payers to which they submit claims. In many cases the provider must contact the payer to obtain clarification about the exact cause for a claim rejecting.

Once a claim is submitted from the healthcare provider to the payer, the healthcare provider often has limited information regarding the status of the claims. Therefore, the provider is unaware of problems in the processing of claims that could be remedied to obtain faster payment of the claim.

What is needed is an all payer, universal system that can ensure that the appropriate format for each particular payer's requirements, the information contained within the claim conforms to the appropriate content specifications, and checks to determine the patient's and provider's ability to receive reimbursement from the payer, when such information is available. If the claim is incorrect, then the claim should be rejected at the time of submission and the provider should receive immediate notification that details the errors.

Once claims in the correct form are received, the system needs to format the claims according to each payers requirements and transmit the claims. Thereafter, the payer applies its rules and either rejects or accepts the claims. This information should be readily accessible by the provider to determine a claim's status. The system should enable the provider to use these status indicators to perform summary or detailed queries as to the overall status of their billing and quickly and efficiently identify claims that require attention. Ideally, the system would allow the provider to determine the status of a claim at all stages of its processing and receive proactive reports indicating when claims have either rejected or when important information is delayed.

SUMMARY OF THE INVENTION

The system is an advanced, web-enabled, clearinghouse that facilitates efficient and effective claim routing and report retrieval. Before claims are submitted for payment, the claims are reviewed by an internal claims editor to ensure the claims comply with known rules for that payer. As a claim proceeds through the various stages of the reimbursement cycle, each step of the claim process is captured and recorded. The system discovers new error messages and new verification rules are added to the claims editor. At times, payers provides error messages that are non-user friendly and ambiguous. These error messages make it difficult to determine the reason for a rejection. Supplementing the error code with user friendly and easy to understand messages helps staff identify the true reason for a rejection. In addition, the system performs payer profiling to identify corresponding patterns in how much correspondence to expect and the length of time to receive the associated correspondence.

Generally speaking, the system receives practice identifying information over the Internet during a log on process. After a successful log into the system, a claim status summary is displayed that links directly to a rejected claim listing. In response to an activation of a rejected claim listing link, the rejected claim listing is displayed wherein each rejected claim listed is a link to associated detailed claim information. The detailed claim information display has fields to edit the associated detailed claim information.

During the claim submission process, a rules verification is performed on the submitted claims to ensure the claims comply with the known rules for the associated payer. Upon successfully completing the rules verification, the edited claim is submitted to a payer. Rejected claims are identified and displayed for the user so that the errored claims can be corrected using the system After submission to the payers, the system may receive claim rejection data. This rejection information is analyzed to determine if the provided rejection code is in the claim management database. If the rejection code is not in the database, it is a new rejection code that the system has not previously encountered. The new rejection code is categorized into a general rejection category. These categories include eligibility errors, duplicate claim errors, provider enrollment errors, coding errors, patient demographic errors, and payer information errors. Categorization of these errors enable a provider to determine where the problems are occurring within their billing system. In addition, a new rejection is analyzed for possible addition of new rules to associate with that payer. Attempting to duplicate the payment rules applied by the payer facilitates rejections by the system at the time of entry of the new claims, and thus, reduces the amount of time need to process a claim and receive payment.

The system captures every action related to the submission of a claim from a provider to the payer and all of the corresponding reports and messages being returned by the payer to the provider. Whenever any action occurs related to a claim the system records the name of the individual performing the action and the date and time that the action was performed. The system stores all of the aforementioned data related to a claim in a relational database so that a customer or other user can review all aspects of the claims history to identify what caused the claim to reject and where and when the error occurred. The unique cross-referenced data structure enables a provider to view all aspects of the claims life cycle from important and unique perspectives. The system's ability to organize the data in a standardized format and also allow the data to be viewed in multiple ways enables a provider to efficiently and effectively improve the percentage of claims that are paid by the payers, increase the amount paid per claim and reduce the administrative expenses for both the provider and the payer.

BRIEF DESCRIPTION OF THE DRAWINGS

Benefits and further features of the present invention will be apparent from a detailed description of preferred embodiment thereof taken in conjunction with the following drawings, wherein like elements are referred to with like reference numbers, and wherein:

FIG. 6 is a functional block diagram illustrating an exemplary table for entity reference data.

FIG. 7 is a functional block diagram illustrating an exemplary table for subscriber reference data.

FIG. 8 is a functional block diagram illustrating an exemplary table for payer reference data.

FIG. 9 is a functional block diagram illustrating an exemplary table for patient plan reference data.

FIG. 11 is a screen shot illustrating an exemplary web page for a scoreboard displaying claim statistics by dollar value.

FIG. 12 is a screen shot illustrating an exemplary web page for displaying a claim listing rejected by the claim management system.

FIG. 13 is a screen shot illustrating an exemplary web page for displaying a claim listing rejected by a payer.

FIG. 15 is a screen shot illustrating an exemplary web page for displaying a claim history.

FIG. 16 is a screen shot illustrating an exemplary web page for displaying an access list.

FIG. 17 is a screen shot illustrating an exemplary web page for displaying an inbound file report.

FIG. 18 is a screen shot illustrating an exemplary web page for displaying a rejection by a payer claim listing.

DETAILED DESCRIPTION OF EMBODIMENTS

Figure 1:
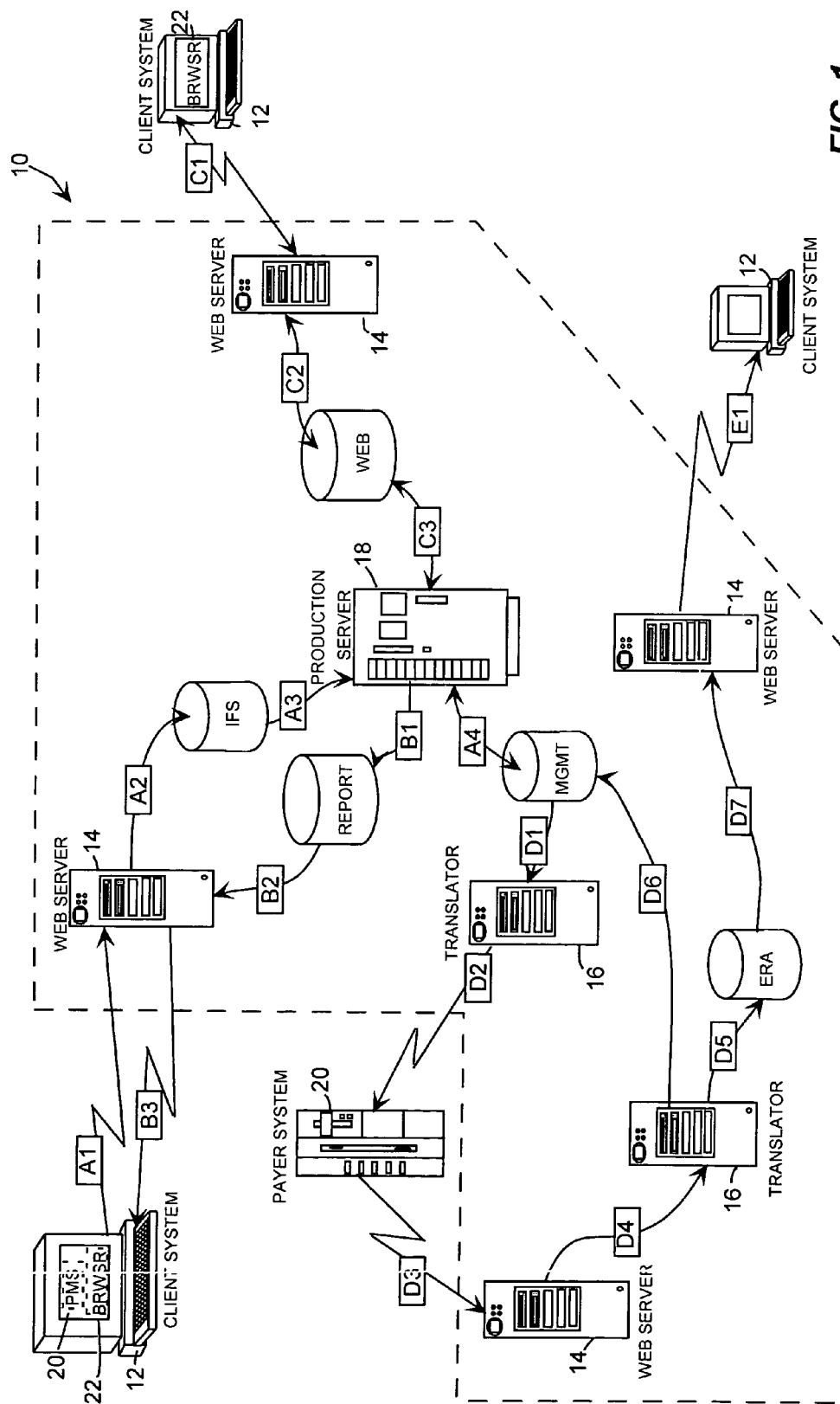
FIG. 1 is a functional block diagram illustrating an overview of an exemplary overview of the claim management system.

The present claim management system is designed to provide integrated insurance claim submission, editing, and reporting. The system builds a complete record for each claim and standardizes the data. For that reason, the system captures every action related to the submission of a claim from a provider to a payer and all of the corresponding reports and messages that have been returned by the payer. Furthermore, the system stores this data related to a claim in a relational database. The unique cross-referenced data structure enables the viewing of the claim life cycle from unique perspectives. Each data table is linked such that all displays can directly provide desired information. The system's ability to organize the data in a standardized linkable format allows the data to be viewed in multiple ways that can vastly improve the percentage of claims that are paid by the payers, increase the amount paid per claim, and reduce the administrative expenses for both the provider and the payer.

The system provides real time responses to claims submitted by a practice management system. The real time response allows claims to be edited at the time of submission. By processing claims at the time of submission, the provider receives instant notification about the claims. As a result, the provider can correct any claims and immediately resubmit the corrected claims. This process eliminates delays for the provider in the payment process and results in fewer calls to the payer's support center. Consequently, the present system can dramatically reduce costs associated with claim processing for both the provider and the payer.

The system operates as an application service provider (ASP). Claims can be uploaded from a practice management system (PMS) or entered directly from a web site. The claim management system (CMS) checks the claims to make sure they are in the appropriate format for the particular payer's requirements and that the information contained within the claim conforms to the appropriate content specifications. If the claim is incorrect, then the claim is rejected at the time of submission and the provider receives immediate notification via an online report which details the errors. At this point the provider has two options:

1) correct the claims in their PMS and resubmit the claims; or
2) select the rejected claims and correct the claims on-line.

Once claims in the correct form are received, the CMS formats the claims according to each payers requirements and transmits the claims to the Payer.

Thereafter, the payer applies its rules and either rejects or accepts the claims. This information is transmitted back to the CMS, where the information is readily accessible by the provider to determine a claim's status.

The CMS reviews and categorizes the thousands of messages being returned by the various payers and assigns them a status based on the assigned rejection categorization. The general rejection categories include selecting from a group consisting of eligibility errors, duplicate claim errors, provider enrollment errors, coding errors, patient demographic errors, and payer information errors. The provider can use these status indicators to perform summary or detailed queries as to the overall status of their claims. In addition, the status summaries can provide a quick and efficient means to identify claims or billing procedures that require attention.

Additionally, the CMS establishes a profile for each payer that indicates which reports are expected back and when they should be received. In the event that a report is not received within the expected time frame, the CMS notifies the provider of the delay. Hence, the provider receives proactive reports indicating when important information is delayed.

Lastly, the CMS reviews all of the informational messages being returned from the payers and edits the messages to insure that the provider can determine the problem based on the message being returned from the payer. The CMS will append additional information to the messages, when appropriate, to assist the provider in determining the appropriate corrective action. The provider can use the reporting tools to generate and view reports hierarchically on claim status for claims submitted by a particular physician, a group of physicians in a practice, a specific payer, a type of payer, a patient, a date of service, a message category, a specific error message or a particular office of a multi-office practice. This information allows the provider to quickly and efficiently identify problem areas that need correction.

Hence, the CMS provides the status of a claim at all stages of its processing and reports indicating when claims have either rejected or when important information is delayed.

Turning to the figures, in which like numerals indicate like elements throughout the several figures, FIG. 1 provides an overview of the claims management system (CMS) 10. A practice management system (PMS) 20 residing on a client site computer network system 12 maintains the practice records. The client system 12 interacts with the CMS 10 to process the practice insurance claims.

As shown in step A1, the PMS 20 uploads a claim batch file over a global computer network to a web server 14 within the CMS 10. The uploaded files are stored using the Internet File System (IFS) schema in the CMS database as shown in step A2. In the next step A3, a production server 18 processes the claim batch files. The claims are parsed from the incoming EDI claim and set into standard ANSI ASC X12 Health Care claim transaction set. During this processing, the system 10 ensures that the information contained within the claims conforms to the appropriate content specifications and all required information is provided. The processed claims are stored using the MGMT schema in the CMS database as shown in step A4. If a claim is incorrect, then the claim is rejected at the time of submission. As shown in step B1, a report is immediately created using the REPORT schema. All known rejections are categorized by the CMS 10 and an easy to read description is attached as part of a report. If the rejection is a new rejection, personnel associated with the CMS 10, review the rejection to categorize the rejection and determine a readable explanation of the rejection. After receiving a rejection, generated reports will automatically provide the readable explanation of the rejection and a category determination for the rejection. Sorting rejection and status messages by categories enables a client to quickly determine where problems exist in their system. As shown by step B2, the web server 14 immediately generates the rejection report and displays the online report to the client system 12 as shown in step B3 via the browser 22. At this point, the provider can correct the claims in their PMS 20 and resubmit a batch claim or select correct the claims online.

A provider at a client system 12 can access the CMS 10 by using a well-known browser application 22 such as INTERNET EXPLORER 5.5 available from Microsoft Corporation. The client system 12 can correct claims, view reports, and even submit new claims online using the browser application 22.

As shown in step C1, the client system 12 accesses the web server 14 within the CMS 10 using a commercially available web browser 22. After logging into the CMS 10, in step C2, web screens are accessed from the WEB repository and presented to the client system 12. The on-line web screens enable the provider to enter new claims, edit rejected claims, and request various reports. All data provided by the web pages are linked so that a user has the ability to drill down to the information desired without the necessity of loading specific screens to view the desired information. In step C3, new edits are processed using MGMT schema in real time by the production server 18. Instant feedback is provided to the client system 12. Each edit is stored using the MGMT schema to provide a complete claim history as shown in step A4.

Upon acceptance by the CMS, a translator 16 formats the claims into the payers format as provided in step D1. The translator 16 transmits the properly formatted claims over a global network to the payer computer network system 20 as shown in step D2. The payer system 20 applies its rules and either accepts or rejects the claims. The claim status is transmitted across a global computer network to the CMS web server 14 as shown in step D3. In step D4, the translator 16 formats the transmitted file data from the proprietary format of the payer into the standardized format utilized by the CMS 10. As shown in step D6, rejections are loaded into the CMS database using the MGMT schema. If claims are accepted, the accepted claim data is loaded into the CMS database using the ERA schema as illustrated by step D5. Accepted claims using the ERA schema are delivered to the web server 14 as provided in step D7 and provided to the client system 12 as shown in step E1.

The provider can access the CMS 10 at any time to view the current claim status, view summaries and reports, edit claims, or enter claims. Because all data tables are linked using a relational database, a provider can easily determine a claim status by activating a link to the claim status without the necessity of requesting a specific web page. As a result, any claim can be easily located and directly edited. Furthermore, categorizing claims into basic rejection categories allows a provider to easily determine what problems are being experienced in the claim processing system. Knowing the number and types of problems experienced with the claim processing system will enable a provider to make corrections to their practice procedures to reduce problem occurrences.

Figure 2:
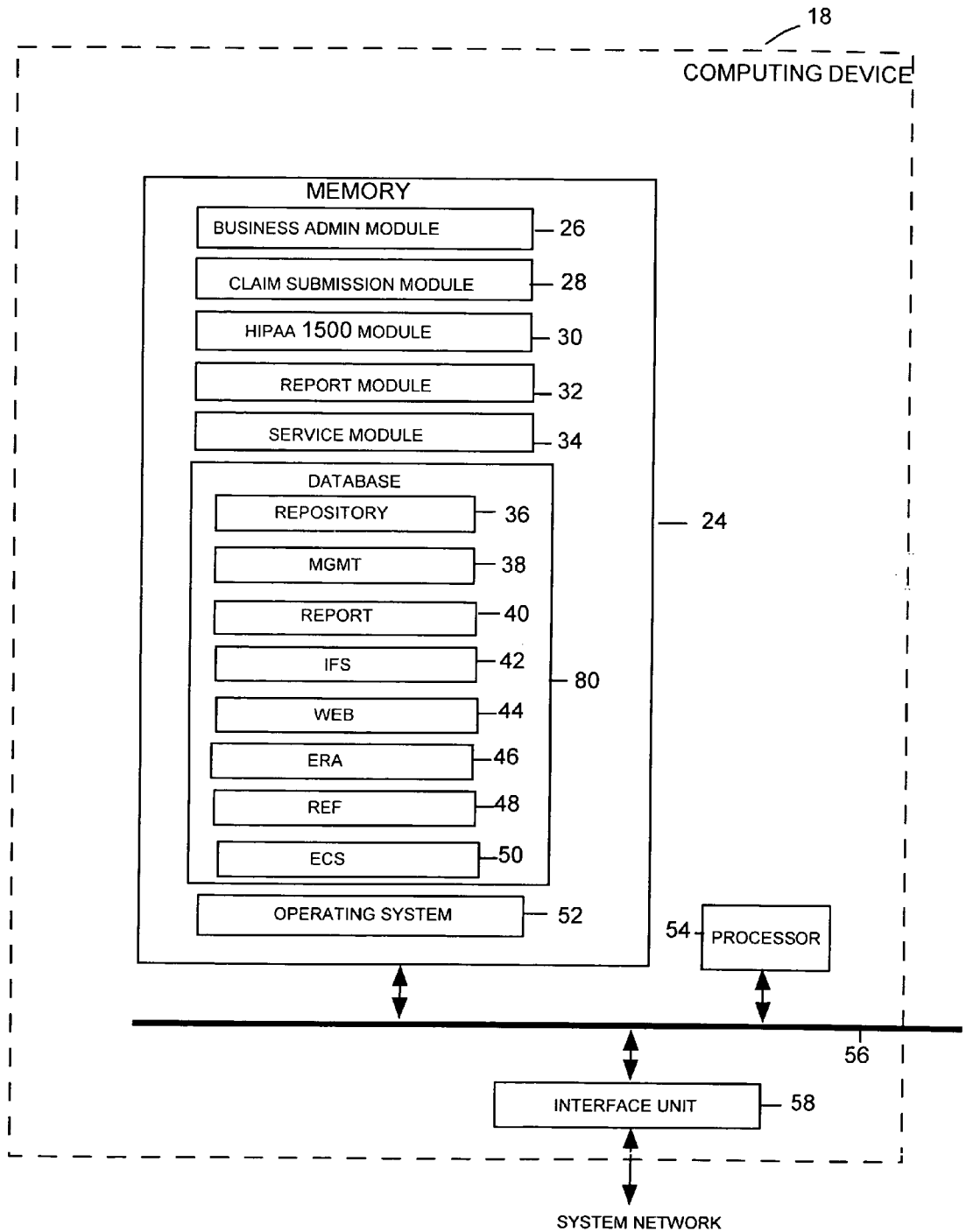
FIG. 2 is a functional block diagram illustrating an exemplary software architecture.

FIG. 2 discloses a logical software architecture of the CMS 10 constructed in accordance with an embodiment of the present invention. As will be understood in the art, the system is constructed utilizing Internet-enabled computer systems with computer programs designed to carry out the functions described herein. The computer programs are executed on computer systems constructed as described in reference to FIG. 3. Although the disclosed embodiments are generally described in reference to Internet-accessible computers, those skilled in the art will recognize that the present invention can be implemented in conjunction with other program modules for other types of computers.

The disclosed embodiment of the present invention is implemented in a distributed computing environment such as the Internet. In a distributed computer environment, program modules may be physically located in different local and remote memory storage devices. Execution of the program modules may occur locally in a stand-alone manner or remotely in a client/server manner. By way of illustration and not limitation, distributed computing environments include local area networks (LAN) of an office, enterprise-wide area networks (WAN), and the global Internet (wired or wireless connections). Accordingly, it will be understood that the terms computer, operating system, and application program include all types of computers and the program modules designed to be implemented by the computers.

The discussion of methods that follows, especially in the flow charts, is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet web site, and the maintenance of these signals within data structures reside in one or more of the local or remote memory storage devices. Such data structures impose a physical organization upon the collection of data stored within a memory storage device and represent specific electrical, optical, magnetic, or similar elements. These symbolic representations are the means used by those skilled in the art of computer programming and computer construction to effectively convey teachings and discoveries to others skilled in the art.

For the purposes of this discussion, a process is understood to include a sequence of computer-executed steps leading to a concrete, useful, and tangible result, namely, the effecting of an integrated claim management system.

These steps generally require manipulations of quantities such as claim amounts, remittance data, service dates, identifiers of claims, patients, providers, billers, and payers, and other related transactional information. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate quantities for computer operations, and that these terms are merely conventional labels applied to quantities that exist within and during operation of the computer.

It should also be understood that manipulations within the computer are often referred to in terms such as displaying, deciding, storing, adding, comparing, moving, positioning, placing, and altering which are often associated with manual operations performed by a human operator. The operations described herein include machine operations performed in conjunction with various input provided by a human operator or user that interacts with the computer. In addition, it will be understood that the programs, processes, routines and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

With the foregoing in mind, the drawing figures starting with FIG. 2 illustrate various functions, processes, or routines carried out by an embodiment of the present invention in which the disclosed CMS 10 carries out the functions described in connection with the flow charts and database maintenance. The functions or processes in these figures are carried out in the disclosed embodiment of the present invention by software executing in computers associated with CMS 10. Depending upon the particular operation, the computers are connected for data communications via a network such as the Internet. It will also be understood that the processes and methods presented here may be arranged differently, or steps taken in a different order. In other words, some processes and methods may be deleted, repeated, re-ordered, combined, or blended to form similar processes and methods.

Turning now to FIG. 2, is a block diagram that illustrates a software architecture upon which an embodiment of the invention may be implemented. The CMS software is processed by a computing device 18. The computing device 18 comprises, at a minimum, a processor 54, memory 24, and an interface unit 58 all coupled together via a bus 56.

The processor (or a plurality of central processing units) 54 executes the software modules 26-34. The memory device 24 coupled to the bus 56 stores information and instructions to be executed by processor 54. An operating system 52 provides a platform for the execution of application modules. A business administration module 26 is operable for processing access rights for the client systems 12 to the CMS 10. A claims submission module 28 is operable for processing batch claim files transmitted submitted by practice management software 20 on the client systems 12 to the CMS 10. A HCFA 1500 module 30 is operable for detail claim viewing, claim editing and submitting claims online. A report module 32 is operable for generating reports. A service module 34 is operable to provide links to other services related to claim processing that a provider may desire. These modules execute the various functions of the CMS as will be described in greater detail in connection with the figures that follow.

The aforementioned modules interact with the CMS database 80 to perform their functions. Tables within the CMS database 80 are divided into schemas based upon functionality. The practice management reference schema (REF) 48 is used to store current active practice management information including information related to entities, patients, insurance plans, subscribers, and profiles. The claims management schema (MGMT) 38 is used to process data related to claim editing. The associated tables contain information in connection with complaints, encounters, claims, and services rendered. The claim revision repository (REPOSITORY) 36 stores any changes made to REF 48 or MGMT 38 data. The repository captures claim history data. The remittance advice schema (ERA) 46 is used to process payer responses to submitted claims to the payer for payment. The report schema (REPORT) 40 is used as a basis to generate any reports. WEB schema 44 processes the CMS web screen used to interface with the client systems. Claim batches submitted by legacy practice systems are stored and managed by the Internet claim files (IFS) 42 schema. The translator account schema (ECS) 50 is used to translate proprietary EDI files. The data described in the foregoing tables are functionally linked such that web pages viewed by the client system 12 links to desired claim information.

The foregoing software architecture is executed on a computing device 18 that operates in a network environment. Operating network of the CMS 10 is illustrated in reference to FIG. 3.

Figure 3:
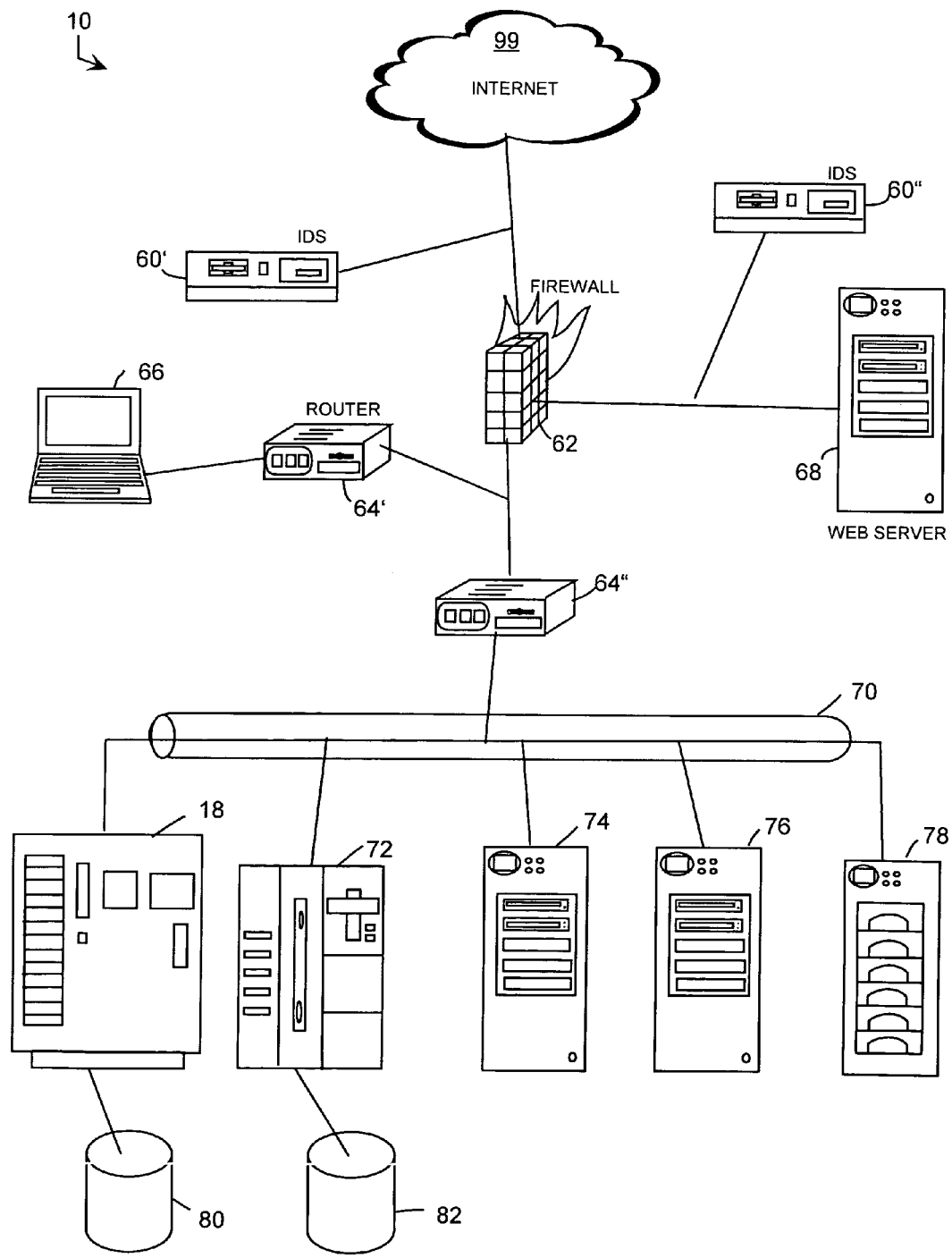
FIG. 3 is a functional block diagram illustrating an exemplary system architecture.

FIG. 3 illustrates an exemplary system network for the CMS 10. The CMS 10 operates as an application service provider (ASP) over a global computer network 99 such as the Internet. The hardware devices described in reference to FIG. 3 are well-known in the art and are commercially available.

An intrusion detection system (IDS) 60' inspects all inbound and outbound network activity and identifies suspicious patterns that may indicate a network or system attack from someone attempting to break into or compromise a system. All messages entering or leaving the intranet pass through a firewall 62, which examines each message and blocks those that do not meet the specified security criteria. Another IDS 60" monitors traffic within the intranet for suspicious activity. An IDS management console 78 analyzes the information provided by the IDS monitors 60 and presents this information to a network administrator.

A web server 68 receives and transmits all Internet 99 communications. The web server 68 provides the CMS web pages to requesting client systems 12. Exemplary web utilized by the CMS 10 pages are illustrated in reference to FIGS. 10 through 18. These web pages allow a provider to submit or edit claims, view claim statistics, or view other reports, as will be discussed in reference to the associated web pages. The data presented by the web pages are linked such that specific claim information can be obtained by activating a link from the current web page without having to request a specific web page. The web server 68 also receives the batch files transmitted from the client systems 10 and transmits reports to the client systems 10. The CMS 10 is maintained and updated by the staff computers 66 that reside behind an office router 64'.

The core network 70 resides behind the firewall 62. A router 64" directs data packets to the appropriate device as addressed by the data packets. The core network, such as Ethernet network, connects the production server 18, the production data repository 80, a production translator 74, a development translator 76, and an IDS management console 78. In addition, a developmental server 72 and associated data repository 82 can be connected to the core network 70.

A production translator 74 has a translation engine that converts data from one format into another and inserts or extracts data from the CMS repository 80. The translator 74 translates proprietary EDI formats into and from the CMS database format. A development translator 76 maintains a development version of a translation engine for converting EDI and other data formats to and from the CMS repository 82.

The production server 18, such as a SUN 4800 model server, houses the oracle repository 80 for transaction data and executes the CMS modules. A majority of the functionality is contained within the CMS database 80, such as an ORACLE database, and utilizes an ORACLE programming language. A development server 72 maintains a development version of the ORACLE repository 82 and core modules. The data processing flow performed by the CMS 10 is illustrated in reference to FIG. 4.

Figure 4A:
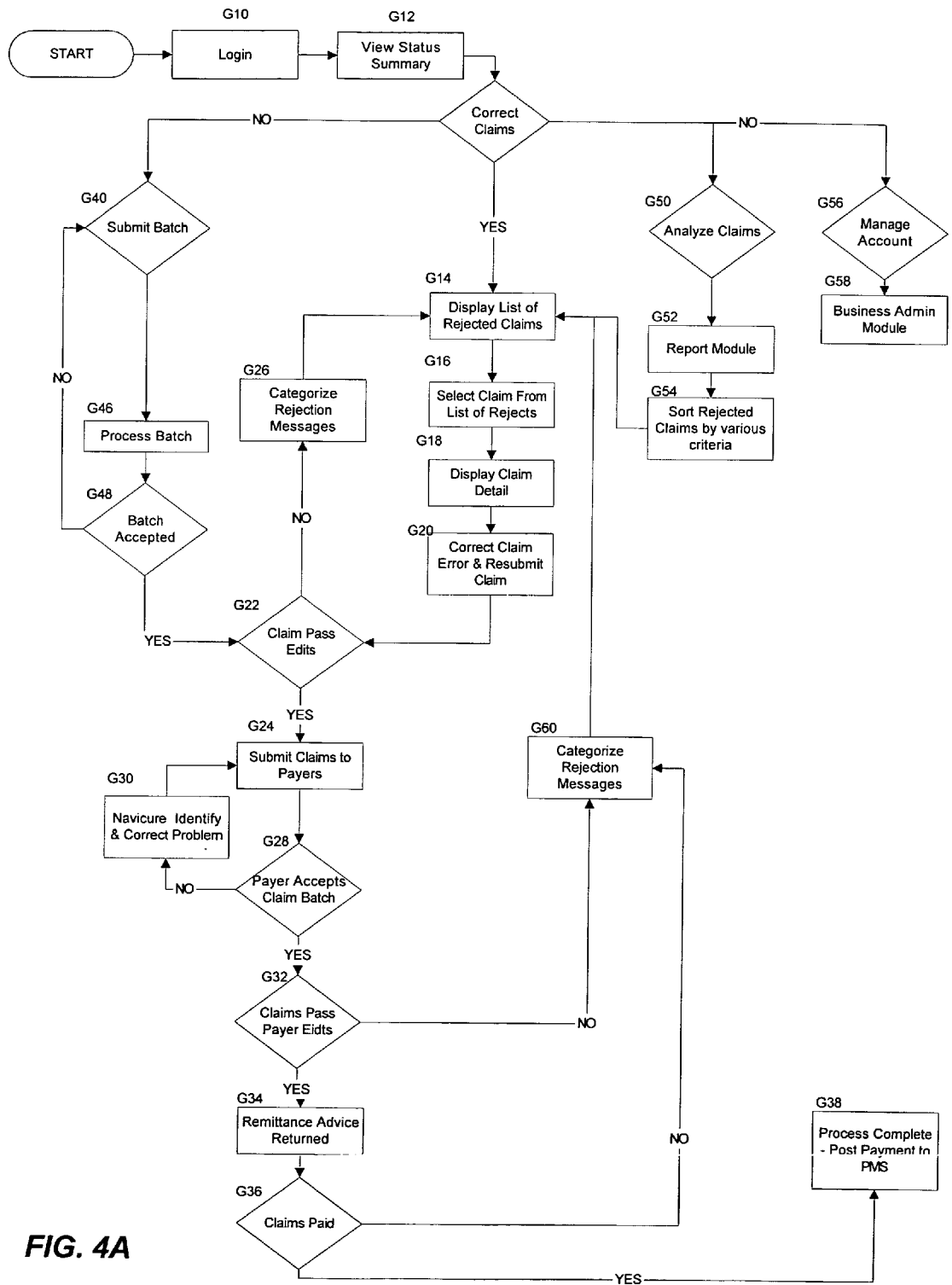
FIGS. 4A and 4B are functional block diagrams illustrating exemplary flow charts for claim processing.

Turning now to FIG. 4A, illustrated is flow diagram illustrating another exemplary data flow process. The claim management system data flow process starts with Step G10, wherein a user logs into the application. Upon logging into the application the user is presented with a display, Step G12, that identifies the summary status of all claims that have been submitted to the CMS.

At this point the user can select to perform several actions through the application. The user can elect to correct rejected claims that are displayed in the summary status, Step G12, by clicking on the number indicator representing the number of claims in error, which in turn generates a list of the rejected claims, Step G14. The user can then select any of the claims from the list, Step G16, which in turn generates a new view showing the selected claim in detail, Step G18, as well as showing the entire list of claims from the previous view. The user can then use various tools to determine the appropriate action to be taken to correct and resubmit, Step G20, the claim.

As part of the resubmission process the claim is checked against known generic and specific format and content requirements, known as edits, Step G22, to insure that the claim has been prepared correctly. If the claim passes the edits successfully then the YES branch of Step G22 is followed to Step G24. If the claim fails the edits then the NO branch of Step G22 is followed to Step G26 at which point the rejection is categorized and can then be displayed and made available for displaying via the Status Summary Display, Step G14, and through the Report Module, Step G52.

To submit a claim file, the user would login to the application, Step G10, and then submit a batch of claims, Step G40. The batch would then be processed, Step G46, to determine that the claims were in the appropriate formats and loaded into the database, Step G48. If the batch was rejected the NO branch of Step G48 would be followed to Step G40 so that the file could be resubmitted.

Returning to Step G22, Following the YES branch to Step G24 indicates that claims accepted for processing are in turn submitted to the Payers. If the payer accepts the claim batch then follow the YES branch from G28 to G32 to determine if the claims passed the Payers Edits. If the claims fail the payers edits then follow the No branch from G28 to G30 where the reason for the batch failure is investigated and resolved, at which point the file is resubmitted via Step G28.

If the claims pass the Payers claims edits Follow the Yes Branch to G34 indicating that a Remittance Advice will be returned to the user with detail indicating payment status for the claims. If the claim is denied on the Remittance advice then the follow the NO branch from Step G36 to Step G60 where the rejection reason is categorized and made available for displaying via the Status Summary Display, Step G14, and through the Report Module, Step G52. If the claim is paid then follow the YES branch from Step G36 to Step G38 indicating the claim is paid.

Returning to the Step G10, after the user has logged into the application they can follow Step G50 to develop reports in order to analyze claim rejections by multiple criteria such as provider, facility, reason code, payer, patient, etc. This is accomplished by selecting the report module Step G52 and then utilizing report filters Step G54 to build reports.

Once the selected claim is dispatched correctly a second claim is displayed from the error list for review. If the claim electing to display the or perform other activities such as submitting a batch of claims, Step G40, run reports, Step G50, or manage account privileges G56.

For illustrative purposes lets assume that the user selects to perform all of these functions in which the claim submission module determines if a batch file processing request has been submitted by a PMS.

Figure 4B:
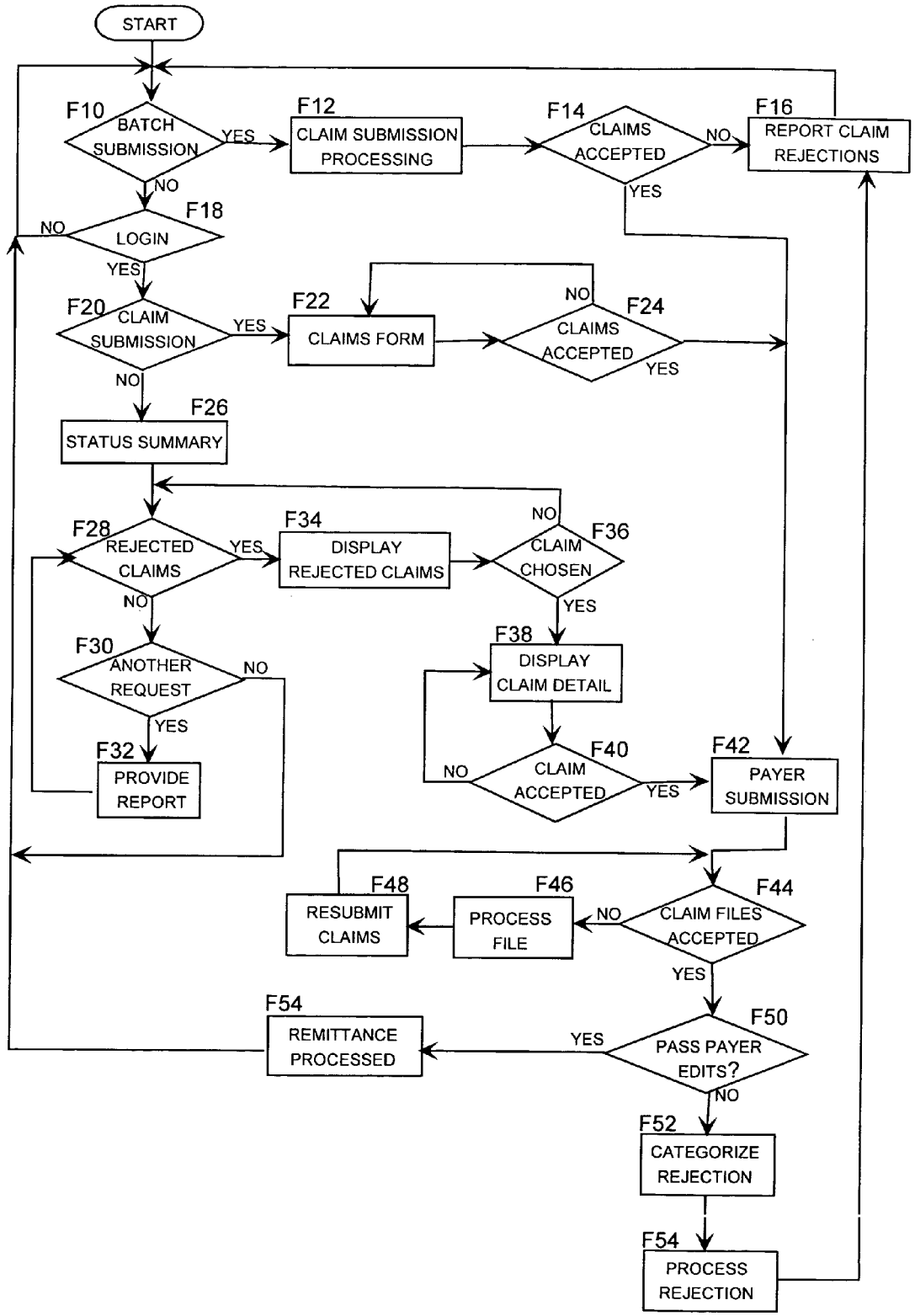

Turn now to FIG. 4b, if a batch request has been submitted, the YES branch of step F10 is followed to step F12. If a batch request has not been submitted, the NO branch of step F10 is followed to step F18, in which web server application determines if a client system has logged into the CMS.

In step F12, the batch claim file is processed. The proprietary EDI format is converted into a format utilized by the database engine. The PMS data is checked to ensure that the PMS authorized to use the CMS. The claims are then analyzed for format and eligibility errors. The claims are checked against standard rules and specific rules of the associated payer. For example, certain service code identification codes have only five digits and have certain values representing the service provided. More specifically, a male patient would be ineligible for obstetric services and an adult would be ineligible for pediatric services. Rejection data by a provider system is analyzed to determine if new rules should be incorporated.

After applying the rules in step F12 to the submitted claims, the claims are either accepted or rejected by the CMS in step F14. If the claims are rejected, the NO branch of step F14 is followed to step F16. If the claims are accepted, the YES branch of step F14 is followed to step F42, in which the claims are processed for submission to the payer.

In step F16, the report module generates a report for the submitted file and provides the status of the claims and written description for all rejections. This report is transmitted over the Internet to the PMS that submitted the batch claim file. Step F16 is followed to step F10, in which the system awaits another batch claim file submission.

The NO branch of step F10 is followed by step F18, in which the system determines if a client system has successfully logged into the CMS. If no successful login has been accomplished, the NO branch of step F18 is followed to step F10 awaiting a batch file submission or a successful login to the CMS. If a client system successfully logs into the CMS, the YES branch of step F18 is followed to step F20, in which the CMS determines if a new claim submission is being dynamically requested. If a new claim submission has not been requested, the NO branch of step F20 is followed to step F26, in which a status summary web page ("the scoreboard") is displayed to the user. If a new claim submission has been requested, the Yes branch of step F20 is followed to step F22.

In step F22, the system generates an electronic HCFA 1500 form web page. This form is an electronic simulation of the well known standardized paper claim submission form used in the industry. This web page is illustrated in detail in reference to FIG. 14. The web page has data fields for the user to input the requested data or to edit the existing data. In step F24, the inputted data is checked against the general submission rules and any specific rules for that particular payer. Following the NO branch of step 24 to step F22, any input data that is not acceptable is immediately rejected and reported to the user, who can edit the information at that time. Upon proper input of all required information, the Yes branch of step F24 is followed to step F42, in which the claim is processed for submission to the payer.

If a new claim is not being submitted, the NO branch of step F20 is followed to step F26. In step F26, the system provides a status summary web page ("scoreboard") to the user. This status summary web page provides an overview of the current status of all submitted claims by that office. A detailed description of the scoreboard is provided in reference to FIG. 10. The scoreboard has links to other reports and links directly rejected claims listing for editing rejected claims. Step F26 is followed by step F28, in which the system determines if the rejected claims listing link has been activated.

If the rejected claims listing link is not activated, the NO branch of step F28 is followed to step F30, in which the system determines if another report is requested. If no additional report is requested, the NO branch of step F30 is followed to step F18, in which the system awaits another request.

If another report is requested, step F30 is followed by step F32 in which the requested report is displayed. Exemplary reports are illustrated in reference to FIGS. 10-18. Step F32 is followed by step F28, in which the system awaits another request by the user.

If the rejected claims listing link is activated, the YES branch of step F28 is followed to step F34, in which the system displays a listing of rejected claims. An exemplary web page providing a rejected claims listing is shown in reference to FIG. 12. Each rejected claim listing is linked such that activation of a link presents a HFCA form 1500 for editing. Step F34 is flowed by step F36, in which the system determines if a rejected claim is chosen for editing.

If a rejected claim link is not activated, the NO branch of step F36 is followed to step F238, in which the system awaits another request by the user. If a rejected claim link is activated, the YES branch of step F36 is followed to step F38, in which the system displays a HFCA 1500 form web page for editing of the claim. Step F38 is followed by step F40, in which the system analyzes the claim edits against the claim rules to determine if the claims are acceptable to submit to the payer. If the claim edits are rejected by the CMS, the NO branch of step F40 is followed to step F38, in which the reason for the rejection is displayed and the claim detail web page is requesting additional edit input. If the claim edits are accepted, the YES branch of step F40 is followed to step F42.

In step 42, the system transmits the claims to the payer for payment. The translator formats the data into the data format required by that particular payer. The file is then electronically transmitted over the Internet to the IP address of the payer file server.

Step F42 is followed by step F44, in which the CMS determines if the payer system accepts the file. If the file is formatted improperly for that payer, the payer system will reject the file. In which case the NO branch of step F44 is followed to step, in which the reason for the rejection is determined. The analysis of the rejected file is typically accomplished manually. The translator code is then updated to conform to the standards currently required by the payer system. Step F46 is followed by step F48, in which the file is reformatted and resubmitted t the payer system. Step F48 is followed by step F44, in which the CMS determines if the claim file has been accepted by the payer system.

If the payer system accepts the file for claim processing, the YES branch of step F44 is followed to step F50, in which the CMS determines if the claim has passed a substantive review by the payer system.

If the claims have passed, the YES branch of step F50 is followed to step F54, in which the remittance is processed. The claim and status data is updated to reflect the payment. Step 54 is followed by step F10, in which the system awaits additional requests by a user.

If the claims have not passed, the NO branch of step F50 is followed to step F52, in which the rejection is categorized. If the rejection is a new rejection that has not been previously categorized, the claim rejection is manually analyzed. The rejection is placed into a broad rejection category and an easily readable description is attached to the claim rejection. Categorizing claims into broad rejection categories facilitate providers in determining where problems are occurring in the claim processing system. Attaching an understandable description to the rejection facilitates provider with claim rejection edits. Step F52 is followed by step F54 in which the claim data is updated to reflect the rejection. Step F54 is followed by step F16 in which a report is transmitted to the PMS. The report includes the claim rejection, the attached rejection description, and the rejection category. Step F16 is followed by step F10, in which the system awaits further requests by a user.

The described data flow format describes merely an exemplary data flow process. Those skilled in the art will recognize that many variations of the above data flow can be used to accomplish the claim processing. The information used in the claim processing is stored in the CMS database Turning now to FIG. 5, the exemplary table structure illustrates the claim data model within the CMS. As previously discussed, tables within the CMS database have been divided into separate schemas based on functionality. Many of the tables defined within the database contain a set of common columns used for auditing and partioning purposes. These common fields include a customer_entity, record_state, modified_by, timestamp, map_code, revision_no, day, and year. The customer_entity is a unique value that has been assigned to every customer group within the database. The record_state is a single byte character that indicates the current state of the record within the table. The modified_by field tracks which user altered information on the record. The timestamp records when the record was last modified. The map_code identifies the method the record was added to a table. The revision no allows the database to hold prior versions of the record. The day and year fields indicate the day and year the record was created. These fields should never contain null values.

Table suffixes are used to help the developer understand the function of the table. There are currently four different table suffixes used. A profile table (_Profile) contains information relating to an entity that is relatively static but is specific to the entity type. A settings or parameter table (_Settings and _Parameters) contains information about an entity which changes often. As the application grows, new settings can easily be added without any database structure changes occurring by inserting new records into the table. Log (_Log) tables indicate a need to track the progression of an object through the database. For example, a claim status will change as it is moved within the system hence a claim_log table. The current status will always be in the "ref" or "mgmt" table while the running history will be maintained in the "repository" table. Statistic tables (_Statistics) provide consolidated information (or metadata) about an object or entity. Unlike most other tables, statistical tables do not keep a revision history. Also it is assumed that internal processes maintain these tables so the column "modified_by" does not exist.

Figure 5:
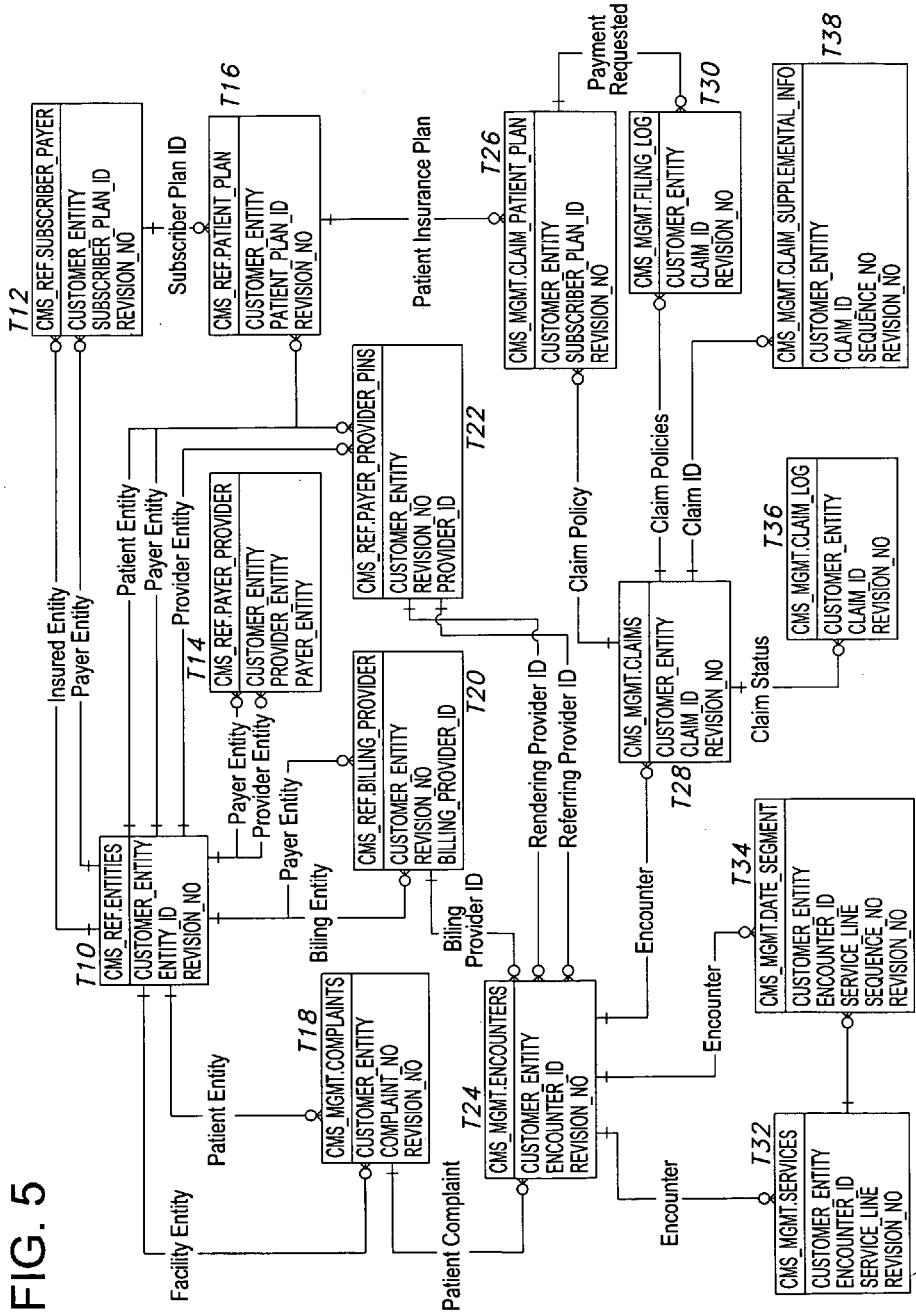
FIG. 5 is a functional block diagram illustrating an exemplary table structure.

FIG. 5 is a table structure for a claim data model. The data model illustrates tables that store information directly for the processing of claims. Other data tables (not shown) store auxiliary information for the processing of claims. The table structure illustrates the interlinking of the tables by common record columns.

The REF.ENTITIES table T10 maintains a revision history of all defined entities within the system. A listing of the REF.ENTITIES table T10 is provided in reference to FIG. 6. Specific information on the subscriber for that payer is maintained in the REF.SUBSCRIBER_PAYER table T12. A listing of the REF.SUBSCRIBER_PAYER table T12 is provided in reference to FIG. 7. The REF.PAYER_PROVIDER table T14 maintains specific information on the payer for that provider. A listing of the REF.PAYER_PROVIDER table T14 is provided in reference to FIG. 8. The provider identification numbers (PINS) is maintained in the REF.PAYER_PROVIDER_PINS table T22. The billing agent information for that provider is maintained in the REF.BILLING_PROVIDER table T20.

The REF.PATIENT_PLAN table T16 maintains specific information on insurance plan for that patient. A listing of the REF.PATIENT_PLAN table T16 is provided in reference to FIG. 9. MGMT.CLAIM_PATIENT_PLAN maintains specific information on patient insurance for the claim being processed.

The MGMT.CLAIMS table T28 maintains specific information about the current claim being processed. The MGMT.CLAIM_SUPPLEMENTAL_INFO table T38 records supplemental information on a claim that is not recorded in other tables.

The MGMT.CLAIM_LOG table T36 maintains a log of the processing a claim. Claim log status codes are used to indicate the current state of the claim within the CMS System at the claim level. The codes themselves are grouped into ranges with generic meanings. Each specific code within the range a unique meaning. The code list has been assigned the "code_type" value of "20". The following table provides a description of the various code ranges used in the claim log:

| Code Range | Generic Description/Purpose |
|---|---|
| 1-9 | Claim submission status codes to CMS |
| 10-19 | Claim internal edit codes |
| 20-29 | Claim forwarded to payer codes |
| 30-39 | Not Used |

-continued

| Code Range | Generic Description/Purpose |
|---|---|
| 40-49 | Response from payer codes (These are not the payer's response codes but rather internal codes defined by CMS) |
| 50-59 | Other Filing Codes |
| 60-69 | Outbound formatting codes |
| 70-79 | Not Used |
| 80-89 | Not Used |
| 90-99 | Final Claim Status |

Specific Claim Status Codes:

| Code | Description |
|---|---|
| 20#1 | CLAIM BEING ENTERED |
| 20#2 | CLAIM UPDATED |
| 20#5 | CLAIM SUBMITTED TO CMS READY FOR EDITS |
| 20#10 | EDITING CLAIM |
| 20#11 | CLAIM FAILED EDIT PROCESS |
| 20#12 | CLAIM ACCEPTED READY TO SEND TO PAYER |
| 20#13 | RESUBMIT CLAIM TO PAYER |
| 20#14 | CLAIM CANCELLED BY SUBMITTER |
| 20#15 | CLAIM TRANSFERRED TO OUTBOUND STAGING AREA |
| 20#20 | TRANSMITTING CLAIM TO PAYER |
| 20#21 | CLAIM TRANSMITTED TO PAYER BY PAPER |
| 20#22 | CLAIM TRANSMITTED TO PAYER ELECTRONICALLY |
| 20#40 | PAYER ACKNOWELDGED RECEIPT |
| 20#41 | PAYER REPORT RECEIVED |
| 20#42 | REMITTANCE ADVICED RECEIVED |
| 20#43 | CLAIM REJECTED BY PAYER |
| 20#44 | CLAIM ACCEPTED BY PAYER |
| 20#45 | CLAIM PAYED BY PAYER |
| 20#46 | CLAIM DENIED BY PAYER |
| 20#51 | SECONDARY FILING AVAILABLE |
| 20#52 | TERTIARY FILING AVAILABLE |
| 20#53 | PATIENT FILING AVAILABLE |
| 20#54 | PATIENT BILLED |
| 20#60 | TRANSLATING CLAIM FOR PAYER |
| 20#61 | CLAIM WRITTEN TO OUTBOUND FILE |
| 20#99 | CLAIM FILING COMPLETED |
| 20#91 | WRITTEN OFF |
| 20#92 | COLLECTIONS |
| 20#98 | CLAIM CORRUPTED |

The example below illustrates the codes that may exist for a claim that has gone through the system. For simplicity only the relevant columns from tables have been shown.

| TIMESTANP | CLAIM_ID | REVISION_NO | STATUS | COMMENTS |
|---|---|---|---|---|
| | | cms_mgmt.claim_log | | |
| 08-JUN-01 | 123456 | 16 | 20#99 | Claim filing complete |
| | | cms_repository.claim_log | | |
| 01-JUN-01 | 123456 | 1 | 20#1 | Claim is being direct entered by customer |
| 01-JUN-01 | 123456 | 2 | 20#1 | Claim is being direct entered by customer |
| 01-JUN-01 | 123456 | 3 | 20#5 | Claim has been submitted to CMS |
| 01-JUN-01 | 123456 | 4 | 20#10 | Claim going through edit process |
| 01-JUN-01 | 123456 | 5 | 20#11 | Claim failed Edit process |
| 03-JUN-01 | 123456 | 6 | 20#5 | Claim fixed by customer ready for edit |
| 03-JUN-01 | 123456 | 7 | 20#10 | Claim going through edit process |
| 03-JUN-01 | 123456 | 8 | 20#12 | Claim passed edits |
| 04-JUN-01 | 123456 | 9 | 20#60 | Claim being translated for payer |
| 04-JUN-01 | 123456 | 10 | 20#61 | Claim written to outbound file |
| 04-JUN-01 | 123456 | 11 | 20#20 | Claim being sent to payer |

-continued

| | | | | |
|---|---|---|---|---|
| 04-JUN-01 | 123456 | 12 | 20#22 | Claim was transmitted electronically |
| 04-JUN-01 | 123456 | 13 | 20#40 | Payer sent acknowledgement receipt |
| 07-JUN-01 | 123456 | 14 | 20#41 | Payer sent report |
| 08-JUN-01 | 123456 | 15 | 20#42 | Payer sent RA |
| 08-JUN-01 | 123456 | 16 | 20#99 | Claim filing complete |

| | |
|---|---|
| Submit Date = | Timestamp of first occurrence of 20#5 |
| Transmission Date = | Timestamp of last occurrence of 20#22 or 20#23 |
| Payer Acknowledgement = | Timestamp of last occurrence of 20#40 |
| Payer Report = | Timestamp of last occurrence of 20#41 |
| RA Received = | Timestamp of last occurrence of 20#42 |

In this example

| CLAIM | SUBMIT_DATE | TRANSMISSION | ACKNOWLEDGEMENT | PAYER_REPORT | RA |
|---|---|---|---|---|---|
| 123456 | 01-JUN-01 | 04-JUN-01 | 04-JUN-01 | 07-JUN-01 | 08-JUN-01 |

Related to the claim log, the MGMT.FILING_LOG table T30 maintains a log of the of the claim filing. Filing log status codes are used to keep track of the filing process at a claim level. For claims that are submitted only once, this information is duplicated information that could be found in the claim log table. However for multiple filings of the same claim to different payers this information is unique. The code list has been assigned the "code_type" value of "21".

There are a limited number of acceptable claim filing status codes. These codes should not be confused with payer codes sent back with responses. These codes are internal generic codes used to help control processing flow:

21#1 READY TO SEND
21#2 CLAIM SENT WAITING FOR PAYER RESPONSE
21#3 RECEIVED PAYER RESPONSE
21#4 RECEIVED REMITTANCE ADVICE
21#5 PAYER FILING COMPLETE

The example below illustrates the codes that may exist for a claim that has gone through the system. For simplicity only the relevant columns from tables have been shown.

| TIMESTAMP | CLAIM_ID | REVISION_NO | PAYER | STATUS | COMMENTS |
|---|---|---|---|---|---|
| | | cms_mgmt.filing_log | | | |
| 08-JUN-01 | 123456 | 5 | 5 | 21#5 | Claim filing complete |
| | | cms_repository.filing_log | | | |
| 03-JUN-01 | 123456 | 1 | 5 | 21#1 | Claim appears once edits are passed |
| 04-JUN-01 | 123456 | 2 | 5 | 21#2 | Claim sent to payer |
| 07-JUN-01 | 123456 | 3 | 5 | 21#3 | Payer sent report |
| 08-JUN-01 | 123456 | 4 | 5 | 21#4 | Payer sent RA |
| 08-JUN-01 | 123456 | 5 | 5 | 21#5 | Claim filing complete |

Had a second filing occurred for this claim, the secondary payer would have been added to the filing log and the process would be repeated. Notice in this example that payer (3) does not return payer responses or RA so those statuses were intentionally skipped.

| TIMESTAMP | CLAIM_ID | REVISION_NO | PAYER | STATUS | COMMENTS |
|---|---|---|---|---|---|
| | | cms_mgmt.filing_log | | | |
| 08-JUN-01 | 123456 | 8 | 3 | 21#5 | Claim filing complete |
| | | cms_repository.filing_log | | | |
| 03-JUN-01 | 123456 | 1 | 5 | 21#1 | Claim appears once edits are passed |
| 04-JUN-01 | 123456 | 2 | 5 | 21#2 | Claim sent to payer |
| 07-JUN-01 | 123456 | 3 | 5 | 21#3 | Payer sent report |
| 08-JUN-01 | 123456 | 4 | 5 | 21#4 | Payer sent RA |
| 08-JUN-01 | 123456 | 5 | 5 | 21#5 | Claim filing complete |

-continued

| TIMESTAMP | CLAIM_ID | REVISION_NO | PAYER | STATUS | COMMENTS |
|---|---|---|---|---|---|
| 09-JUN-01 | 123456 | 6 | 3 | 21#1 | New Payer secondary filing of claim |
| 09-JUN-01 | 123456 | 7 | 3 | 21#2 | Claim sent to payer |
| 09-JUN-01 | 123456 | 8 | 3 | 21#5 | Claim filing complete |

The MGMT.ENCOUNTERS table T24 maintains specific information about the encounter for the claim being processed. The MGMT.COMPLAINTS table T18 maintains specific information on patient complaints about the claim being processed. The MGMT.DATE_SEGMENT table T34 maintains date information for the encounter. The MGMT.SERVICES table T32 maintains specific information about the services rendered by a provider for the claim being processed.

The table structure illustrated in FIG. 5 provides the framework for storing data concerning a claim submitted by a provider. Selected tables within the claim data model claim structure are presented in reference to FIGS. 6-9. This data is processed by the CMS in accordance with the flow process previously outlined.

FIGS. 6-9 illustrate selected tables discussed in reference to the claim data model described in FIG. 5.

FIG. 6 illustrates a REF.ENTITY table T10 that maintains a revision history of all defined entities with the CMS. The records associated with the table are listing in the Column Name column C10. The data type column C12 provides the data type and size for the stored information within the database. The Nullable column C14 indicates whether the associated field can be a null character. The Description column C16 provides a written description of the record.

FIG. 7 illustrates a REF.SUBSCRIBER_PAYER table T12 that maintains specific subscriber information related to a specific payer. The records associated with the table are listing in the Column Name column C18. The data type column C20 provides the data type and size for the stored information within the database. The Nullable column C22 indicates whether the associated field can be a null character. The Description column C24 provides a written description of the record.

FIG. 8 illustrates a REF.PAYER_PROVIDER table T14 that maintains specific payer information related to a provider. The records associated with the table are listing in the Column Name column C26. The data type column C28 provides the data type and size for the stored information within the database. The Nullable column C30 indicates whether the associated field can be a null character. The Description column C32 provides a written description of the record.

FIG. 9 illustrates a REF.PATIENTS_PLAN table T16 that maintains specific information related to a patient's insurance plan The records associated with the table are listing in the Column Name column C34. The data type column C36 provides the data type and size for the stored information within the database. The Nullable column C38 indicates whether the associated field can be a null character. The Description column C40 provides a written description of the record.

Figure 10:
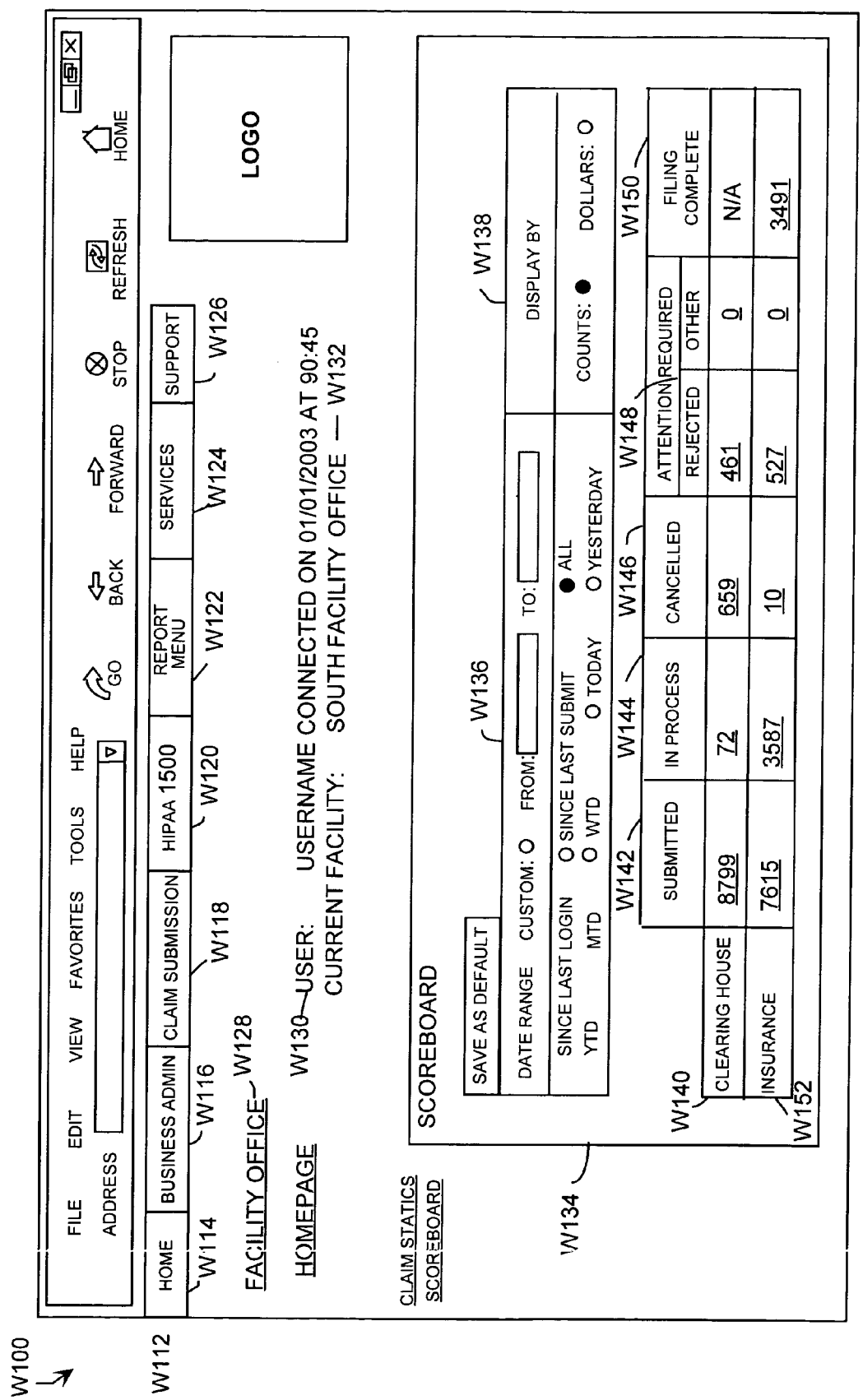
FIG. 10 is a screen shot illustrating an exemplary web page for a scoreboard displaying claim statistics by numerical count.

Turning to FIG. 10, the screen shot illustrates an Internet web page W 100 displayed by the CMS in response to a user successfully completing the login phase into the CMS. The scoreboard web page W100 displays the statistical information about the claims filed by the practice. Interactive web pages are well known in the art.

A menu bar W112 provides active links to various modules offered by the CMS. The Home button W114 generates a scoreboard page W100 for display to the requester. The Business Admin button W116 links to web pages that allow practice administers to set permissions for users within their practice to access or change information within the CMS. The claim Submission button W118 links to web pages that enable a user to submit new claim. The Report Menu button W122 links to a web page that enable the user to select desired reports. The Services button W122 links to a web page that provides links to services offered by other providers or to relevant information sources. The Support button W126 links to web page that offers technical support information and support personnel contact information.

The Scoreboard web page W100 has a Facility Office link W128 that when activated allows the user to select the current facility claim information for display as indicated by the Current Facility designation W132. The current user is indicated by the User designation W130.

The scoreboard area W134 provides claim statistics for the selected facility. The user can set the desired date range by the Date Range selectors W136. The user can also select by the Display By selector W138 to view claims by count or by dollars, which is the dollar value associated with the claims in the category.

The line designated as Clearing House W140 presents the status of claims as it passes from the practice to CMS. The Submitted Box W142 presents the number of claims or the dollar value of the claims that have been submitted to the CMS. The In Process Box W144 indicates the claims that have been accepted by the CMS and awaiting transmission to the appropriate destination. The Cancelled Box W146 identifies claims that have-been cancelled by the customer. The Rejected Box W148 indicates the claims that have been rejected by CMS because of detected problems with the claim.

The line designated as Insurance W 152 presents the status of claims as it passes from CMS through the insurance companies adjudication system. The Submitted Box W1142 presents the number of claims or the dollar value of the claims that have been submitted to the payer by CMS. The In Process Box W144 indicates the claims that have been submitted to the payers and are awaiting further reports. CMS establishes a profile for each payer and a claim stays in the In Process until all expected reports or acknowledgements have been received in the affirmative. The Cancelled Box W146 identifies claims that have been cancelled by the customer. The Rejected Box W148 indicates the claims that have been rejected by the payer. The Filing Complete box WI 50 indicates the claims for which CMS has received all of the anticipated affirmative reports.

Clicking on the number link in any of the boxes generates and presents a list of the claims for that box. By activating the Rejected box W148 on the CMS line W140, CMS generates and displays a list of claims that have been rejected for failing the CMS edits as illustrated in reference to FIG. 12. By activating the Rejected box W148 on the Insurance line WI 52, CMS generates and displays a list of claims that have been rejected for failing the payer edits as illustrated in reference to FIG. 13.

Figure 11:
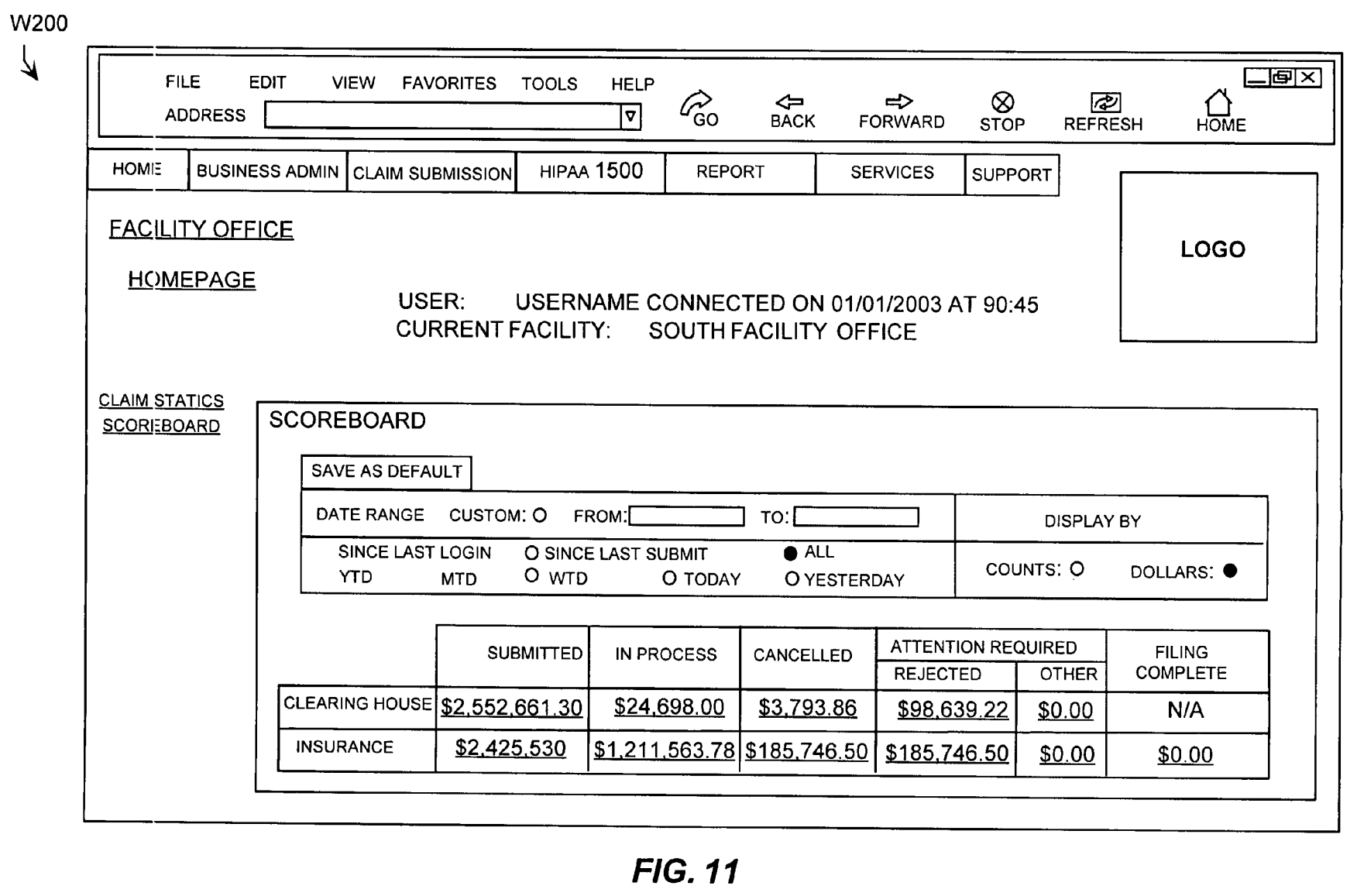

Turning to FIG. 11, the screen shot illustrates an Internet web page W200 displayed by the CMS in response to a user the Display BY Dollars selector W138 from the Scoreboard web page described in reference to FIG. 10. The web page W200 displays the same claims filed by the practice illustrated in reference to FIG. 10 with the exception the data is presented in terms of dollar value of the claims rather than the number of claims in each category.

Turning to FIG. 12, the screen shot illustrates an Internet web page W300 displayed by the CMS in response to a user activating the Rejected link W302 on the Clearing House line W140. The web page W300 displays a Rejected List W304 of all claims that stand rejected by the CMS. The claims presented by this screen are listed in descending dollar amounts to focus attention on the most significant dollar claim amounts. Activating a claim ID link W306 would cause the CMS to generate and display a detailed view of that claim on a HCFA 1500 web page that is illustrated in reference to FIG. 14.

Turning to FIG. 13, the screen shot illustrates an Internet web page W400 displayed by the CMS in response to a user activating the Rejected link on the Insurance line W152. The web page W400 displays a Rejected List W402 of all claims that stand rejected by the payer. The claims presented by this screen are listed in descending dollar amounts to focus attention on the most significant dollar claim amounts. Activating a claim ID link W404 would cause the CMS to generate and display a detailed view of that claim on a HCFA 1500 web page that is illustrated in reference to FIG. 14.

Figure 14:
FIG. 14 is a screen shot illustrating an exemplary web page for displaying an editable HFCA 1500 form.

Turning to FIG. 14, the screen shot illustrates an Internet web page W500 displayed by the CMS in response to a user activating a claim ID link W306 or W404. The web page W500 present a HFCA 1500 form. The claim input fields provide the user the ability to correct and resubmit the claim. Once a claim has been corrected and resubmitted, the next rejected claim is automatically loaded into the form for correction. Claim Status Display box W502 displays the current status of the claim. While the claim Progress box W504 displays information about the progress of the claim, listing the date and time that action occurred related to the claim. A History link W506 links to a web page that display the entire claim history as illustrated in reference to FIG. 15.

Figure 15:
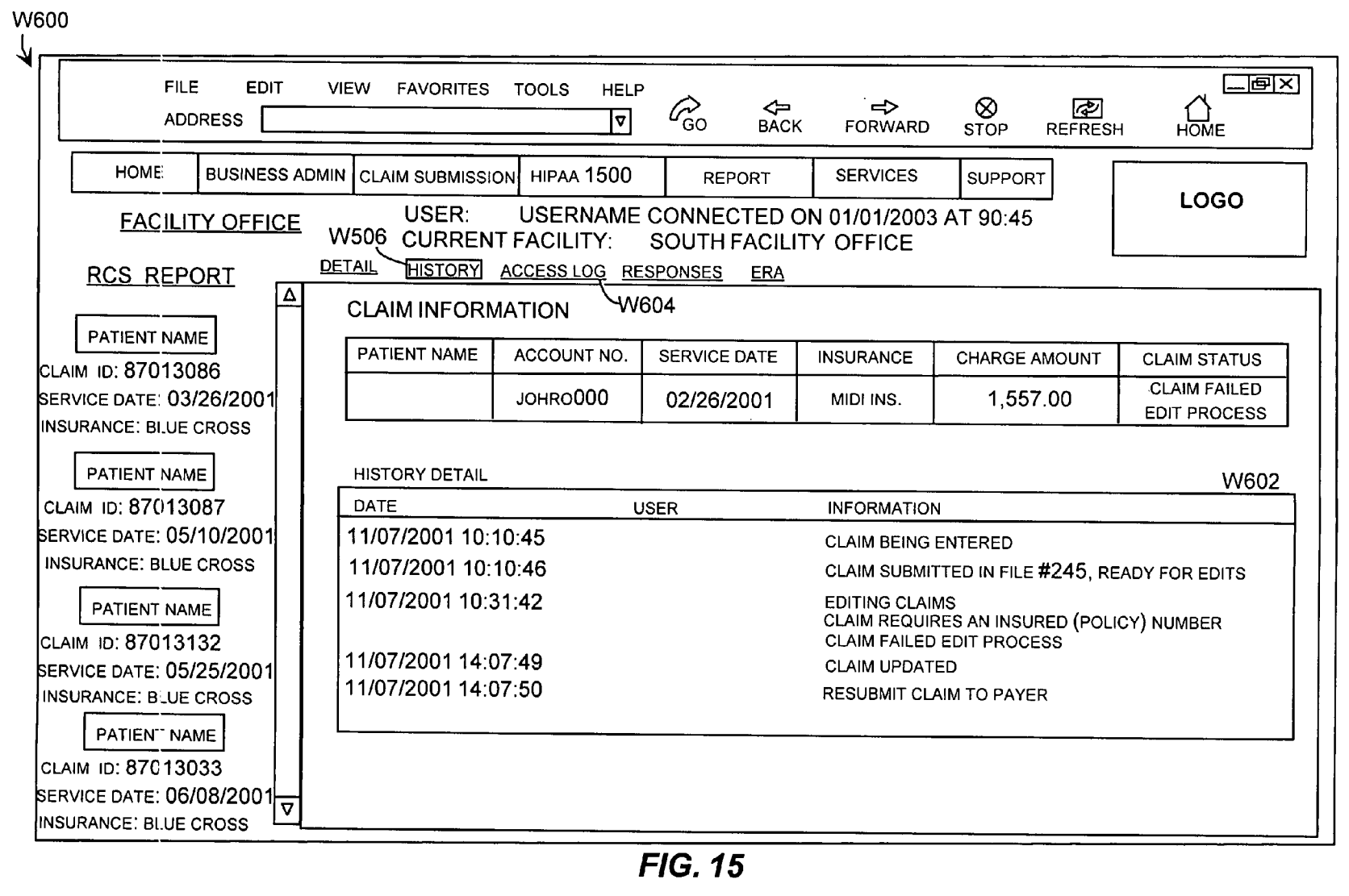

Turning to FIG. 15, the screen shot illustrates an Internet web page W600 displayed by the CMS in response to a user activating the History link W506. The web page W600 displays the history related to that claim in the History box W602. The date and time, a description of the action, and the person performing the action are displayed. Each edit or change in claim information has been recorded and is displayed. Rejection messages are displayed in red for highlight. An Access Log link W604 displays a web page listing of every access to information related to the claim as illustrated in reference FIG. 16.

Figure 16:
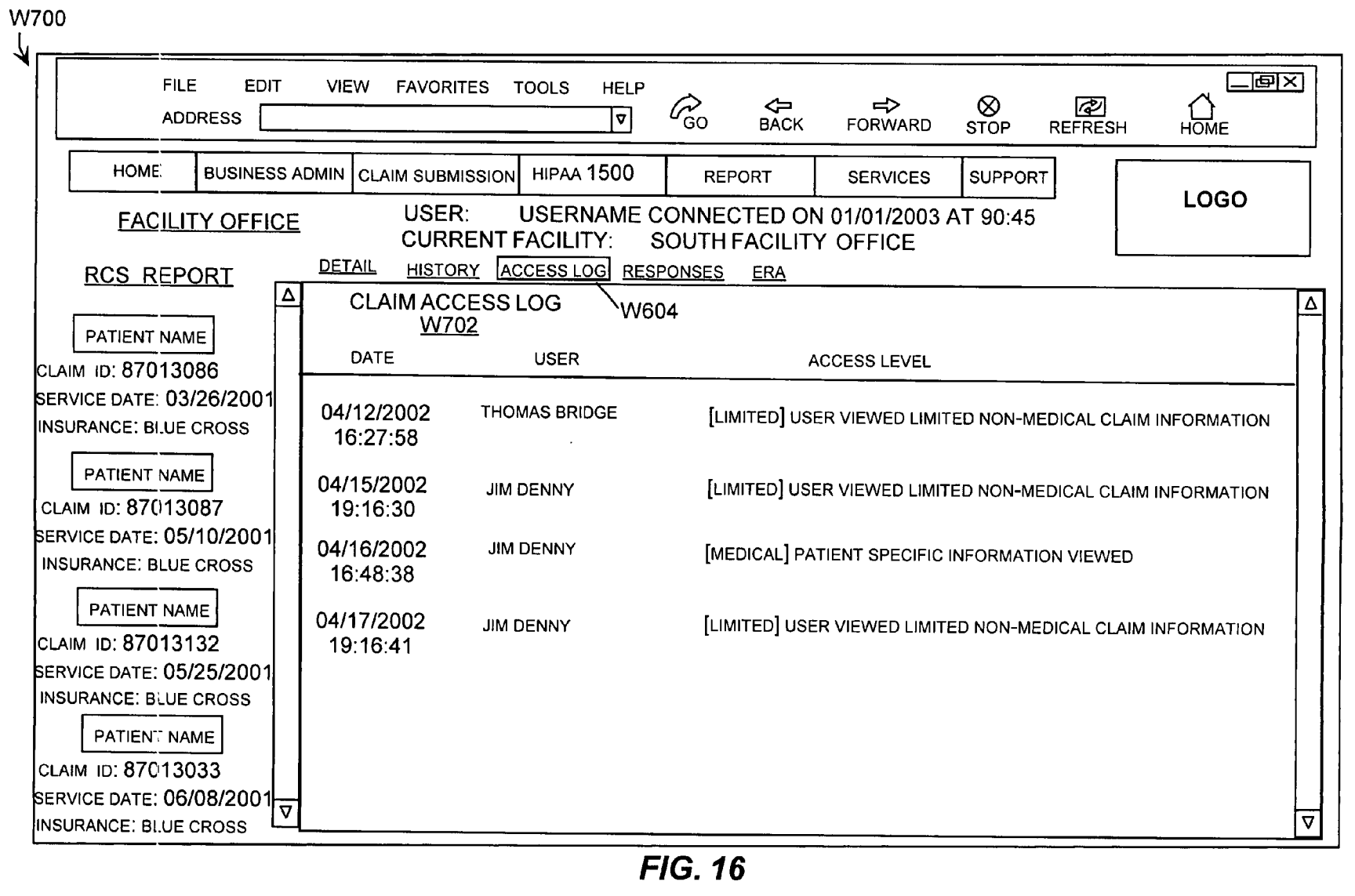

Turning to FIG. 16 the screen shot illustrates an Internet web page W700 displayed by the CMS in response to a user activating the Access link W604. The web page W700 displays an Access List W702 listing the names of all individuals who have accessed the claims. Limited access indication is used when the claim was included on a list but no clinical data was displayed.

Figure 17:
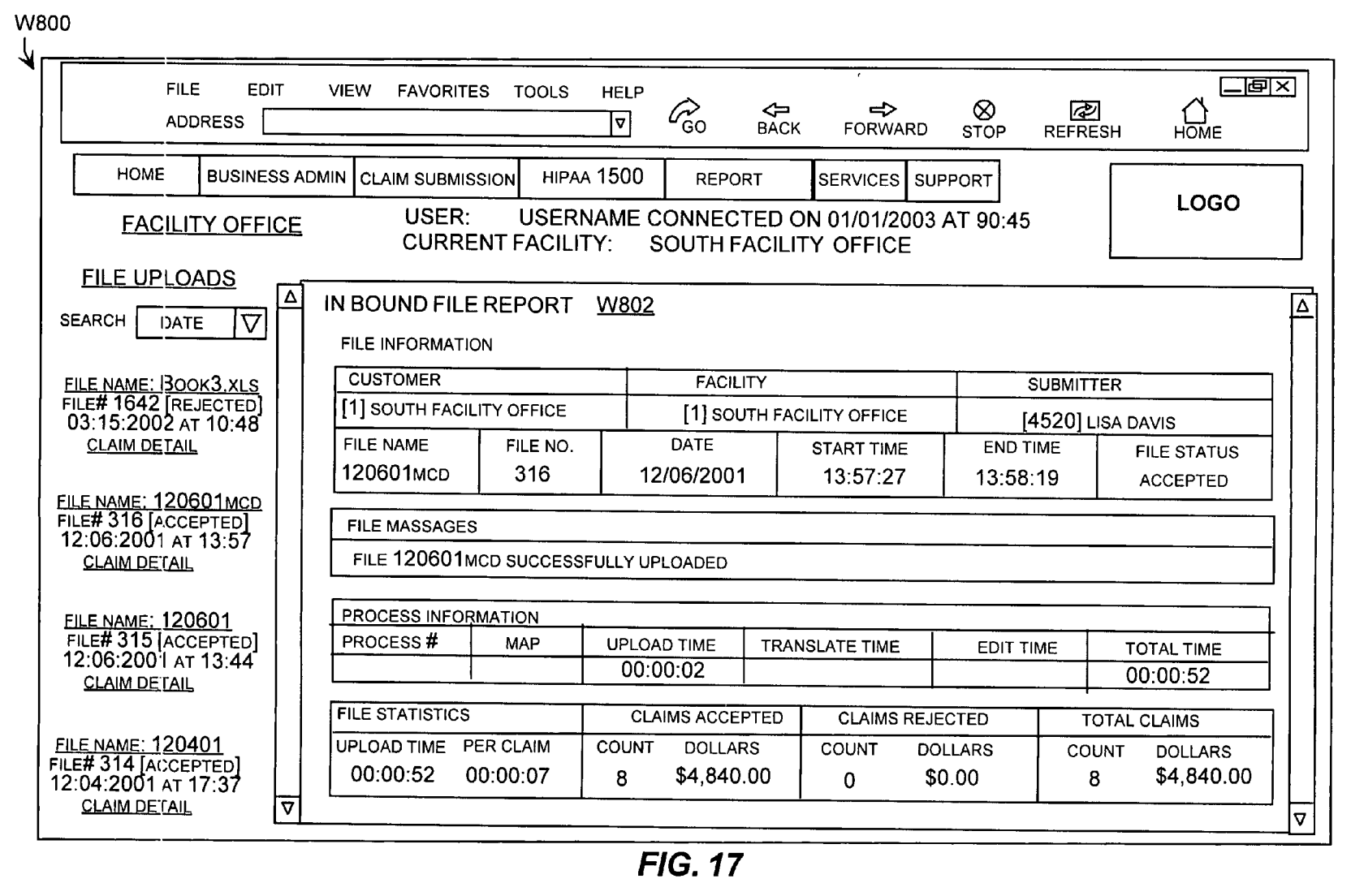

Turning to FIG. 17, the screen shot illustrates an In-Bound File Report W802. The Internet web page W800 is displayed by the CMS in response to all claims having passed the CMS edits and indicates the status of the submitted claims. If any claims are rejected by the payer, those claims would be listed in the rejected box and highlighted in red.

Turning to FIG. 18, the screen shot illustrates an Internet web page W900 displayed by the CMS in response to a user activating the Count link. Activating any claim ID link W902 would generate and display the HFCA form web page illustrated in reference to FIG. 14 to allow claim editing.

In view of the foregoing, it will be appreciated that the present system provides an improved practice management claim processing system. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustrations, which are intended to define the exclusive rights of the invention.

The invention claimed:

1. In a medical insurance payment system having a plurality of medical providers and a plurality of insurance payers, wherein medical reimbursement claims are submitted electronically from practice management computer systems of the plurality of medical providers to claims processing computer systems of the plurality of insurance payers for payment determinations, wherein an intermediary claim management system is in electronic communication between the practice management computer systems of the plurality of medical providers and the claims processing computer systems of the plurality of insurance payers, wherein the intermediary claim management system includes a claim management database for storing claim information and a processor for performing a computer-implementable method for improving medical reimbursement claim processing between medical providers and insurance providers, comprising the steps of:

(a) prior to receiving a particular medical reimbursement claim at the intermediary claim management system from a particular medical provider:

(i) receiving a plurality of medical reimbursement claims at the intermediary claim management system electronically from the practice management computer systems of the plurality of medical providers, each of the plurality of claims including data about a patient of a respective provider, a service provided to the patient by the respective provider, and a respective payer to whom the claim must be submitted for payment;

(ii) submitting each of the plurality of claims electronically from the intermediary claim management system to the claims processing computer system of each respective payer for payment determination;

(iii) receiving a substantive response at the intermediary claim management system from the claims processing computer system of each respective payer for each respective claim, each substantive response including one or more of claim acknowledgement data, claim acceptance data, and claim rejection data, the claim rejection data including one or more payer claim rejection identifiers relating to specific issues in the claim identified by the respective payer;

(iv) for each substantive response that includes claim rejection data, associating via the intermediary claim management system processor each payer claim rejection identifier with one of a plurality of predefined claim rejection categories and one of a plurality of predefined rejection descriptions in the claim management database as a function of claim rejection identifier type;

(b) receiving the particular medical reimbursement claim at the intermediary claim management system electronically from the practice management computer system of the particular medical provider;

(i) generating a claim record for the particular claim via the intermediary claim management system processor, and storing the claim record in the claim management database;

(ii) submitting the particular claim electronically from the intermediary claim management system to the claims processing computer system of a particular insurance payer for payment determination;

(iii) receiving a particular substantive response at the intermediary claim management system from the claims processing computer system of the particular insurance payer for the particular claim;

(iv) if the particular substantive response includes claim rejection data, extracting one or more payer claim rejection identifiers from the claim rejection data via the intermediary claim management system processor;

(iv) determining a corresponding predefined claim rejection category and predefined rejection description for each extracted claim rejection identifier for the particular claim based on the predefined claim rejection category and predefined rejection description associated with the extracted claim rejection identifier in the claim management database;

(v) updating the claim record for the particular claim in the claim management database to include the corresponding predefined claim rejection category and predefined rejection description determined for each extracted claim rejection identifier; and (vi) displaying each corresponding predefined claim rejection category and predefined rejection description for the particular claim to the particular medical provider based on the updated claim record for the particular claim, whereby the particular medical provider is able to determine if further action on the particular claim is necessary as a function of specific issues associated with the particular claim.

2. The method of claim 1, wherein at least one of the specific issues in the plurality of claims identified by the plurality of insurance payers comprises required information missing from one or more of the claims.

3. The method of claim 1, wherein at least one of the specific issues in the plurality of claims identified by the plurality of insurance payers comprises information within a respective claim being internally discrepant.

4. The method of claim 3, wherein information within the respective claim is internally discrepant if at least two pieces of information are not permitted to coexist within the claim based on a rule of one or more of the plurality of insurance payers.

5. The method of claim 1, further comprising the step of, before submitting the particular medical reimbursement claim electronically from the intermediary claim management system to the claims processing computer system of the particular insurance payer for payment determination, determining if the particular claim has any potential specific issues based on rules within the intermediary claim management system derived from previous issues associated with the plurality of prior-received medical reimbursement claims, and if the particular claim has one or more specific issues, presenting the particular claim back to the particular medical provider for correction.

6. The method of claim 5, wherein the step of presenting the particular claim back to the particular medical provider comprises flagging the one or more specific issues in the claim that need to be corrected.

7. The method of claim 5, wherein the step of presenting the particular claim back to the particular medical provider comprises sending an email notification to the particular medical provider.

8. The method of claim 5, wherein the step of presenting the particular claim back to the particular medical provider comprises displaying one or more of the plurality of predefined claim rejection categories and one or more of the plurality of predefined rejection descriptions associated with the one or more specific issues in conjunction with the particular claim to the particular medical provider on an interactive, web-accessible site generated and provided by the intermediary claim management system.

9. The method of claim 8, further comprising the step of receiving edits to the particular claim from the respective provider directly within the interactive, web-accessible site, and updating the claim record for the particular claim to include the edits.

10. The method of claim 1, wherein each of the plurality of predefined rejection descriptions is displayed in a human-understandable text format.

11. The method of claim 1, further comprising the step of displaying a status of the particular claim to the particular medical provider prior to receiving the particular substantive response from the claims processing computer system of the particular insurance payer.

12. The method of claim 1, wherein each corresponding predefined claim rejection category and redefined rejection description for the particular claim is displayed to the particular medical provider on an interactive, web-accessible site generated by the intermediary claim management system.

13. The method of claim 1, wherein the step of displaying each corresponding predefined claim rejection category and predefined rejection description for the particular claim to the particular medical provider comprises sending an email notification to the particular medical provider.

14. The method of claim 1, further comprising the step of displaying a report about the particular claim to the respective particular medical provider on an interactive, web-accessible site generated and provided by the intermediary claim management system.

15. The method of claim 1, wherein at least one of the specific issues in the plurality of claims identified by the plurality of insurance payers comprises inaccurate information in one or more of the claims.

16. The method of claim 1, wherein the plurality of predefined claim rejection categories are selected from the group comprising: eligibility errors, duplicate claim errors, provider enrollment errors, coding errors, patient demographic errors, payer information errors.

17. The method of claim 1, wherein one or more of the payer claim rejection identifiers are proprietary to each respective insurance payer.

18. The method of claim 1, wherein the claim acknowledgement data comprises information indicating that the respective claim has been accepted for processing by the respective payer.

19. The method of claim 1, wherein the claim acceptance data comprises information indicating the respective claim has been approved for payment by the respective payer and indicating terms of the payment.

20. The method of claim 19, wherein the claim acceptance data further comprises remittance advice.

21. The method of claim 1, wherein the step of associating each payer claim rejection identifier with one of the plurality of predefined claim rejection categories and one of the plurality of predefined claim rejection descriptions comprises linking each payer claim rejection identifier with one of the plurality of predefined claim rejection categories and one of the plurality of predefined rejection descriptions in a cross-referenced data structure in the claim management database.

22. The method of claim 1, wherein the step of determining the corresponding predefined claim rejection category and predefined rejection description for each extracted claim rejection identifier for the particular claim comprises:
   comparing each extracted claim rejection identifier to previously-received claim rejection identifiers stored in the claim management database;
   identifying a matching previously-received claim rejection identifier for each extracted claim rejection identifier; and
   retrieving the associated predefined claim rejection category and predefined rejection description associated with each matched previously-received claim rejection identifier.

23. In a medical insurance payment system having a plurality of medical providers and a plurality of insurance payers, wherein medical reimbursement claims are submitted electronically from practice management computer systems of the plurality of medical providers to claims processing computer systems of the plurality of insurance payers for payment determinations, wherein an intermediary claim management system is in electronic communication between the practice management computer systems of the plurality of medical providers and the claims processing computer systems of the plurality of insurance payers, wherein the intermediary claim management system includes a claim management database for storing claim information and a processor for performing a computer-implementable method for improving medical reimbursement claim processing between medical providers and insurance providers, comprising the steps of:
   (a) prior to receiving a particular medical reimbursement claim at the intermediary claim management system from a particular medical provider:
      (i) receiving a plurality of medical reimbursement claims at the intermediary claim management system electronically from the practice management computer systems of the plurality of medical providers, each of the plurality of claims including data about a patient of a respective provider, a service provided to the patient by the respective provider, and a respective payer to whom the claim must be submitted for payment;
      (ii) submitting each of the plurality of claims electronically from the intermediary claim management system to the claims processing computer system of each respective payer for payment determination;
      (iii) receiving a substantive response at the intermediary claim management system from the claims processing computer system of each respective payer for each respective claim;
      (iv) for each substantive response received from each respective payer, generating via the-intermediary claim management system processor claim history data indicative of (a) a response type, and (b) a response time, wherein the response time comprises the amount of time between submission of the respective claim to the respective payer and receipt of the substantive response from the respective payer;
      (v) storing the claim history data in the claim management database;
      (vi) for each respective payer, identifying one or more patterns in the claim history data indicating expected response types and expected response times for claims submitted to the respective payer;
      (vii) generating a profile for each respective payer via the intermediary claim management system processor based on the one or more identified patterns in the claim history data, and storing each profile in the claim management database;
   (b) receiving the particular medical reimbursement claim at the intermediary claim management system electronically from the practice management computer system of the particular medical provider, the particular claim including data identifying a particular insurance payer for payment of the particular claim;
      (i) determining the particular insurance payer associated with the particular claim by extracting the data identifying the particular insurance payer from the particular claim via the intermediary claim management system processor;
      (ii) retrieving a particular profile for the particular insurance payer from the claim management database;
      (iii) extracting at least one expected response type and at least one expected response time from the particular profile for the particular payer based on the particular claim via the intermediary claim management system processor; and
      (iv) displaying the at least once expected response type and the at least one expected response time for the particular claim to the particular medical provider,
   whereby the particular medical provider is able to determine if further action on the particular claim is necessary based on the at least one expected response type and the at least one expected response time associated with the particular claim.

24. The method of claim 23, further comprising the steps of:
   submitting the particular claim electronically from the intermediary claim management system to the claims processing computer system of the particular insurance payer for payment determination; and
   generating and presenting an alert to the particular medical provider via the intermediary claims management system processor if a particular substantive response for the particular claim is not received by the intermediary claim management system within the at least one expected response time identified for the particular insurance payer.

25. The method of claim 23, wherein the response type is selected from the group comprising: a rejection of the respective claim, a current status of the respective, claim, a request for additional information associated with the respective claim, an approval of the respective claim for payment.

26. The method of claim 23, wherein each substantive response comprises a report generated by each respective payer.

* * * * *